July 22, 1958
A. W. VIBBER
2,843,997
TWISTING SPINDLE BALLOON CONTROL
Filed May 8, 1951
10 Sheets-Sheet 3
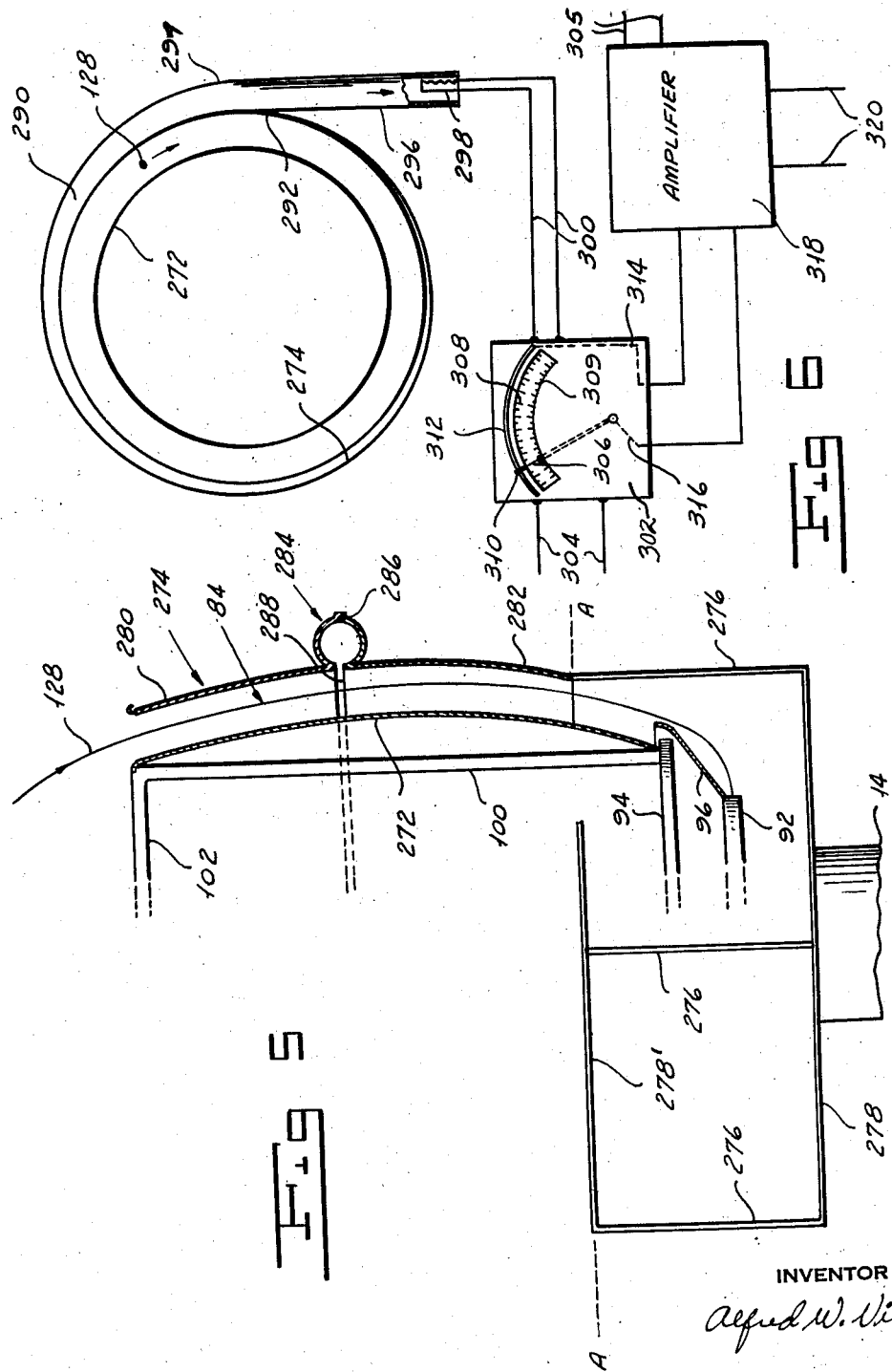
INVENTOR
Alfred W. Vibber

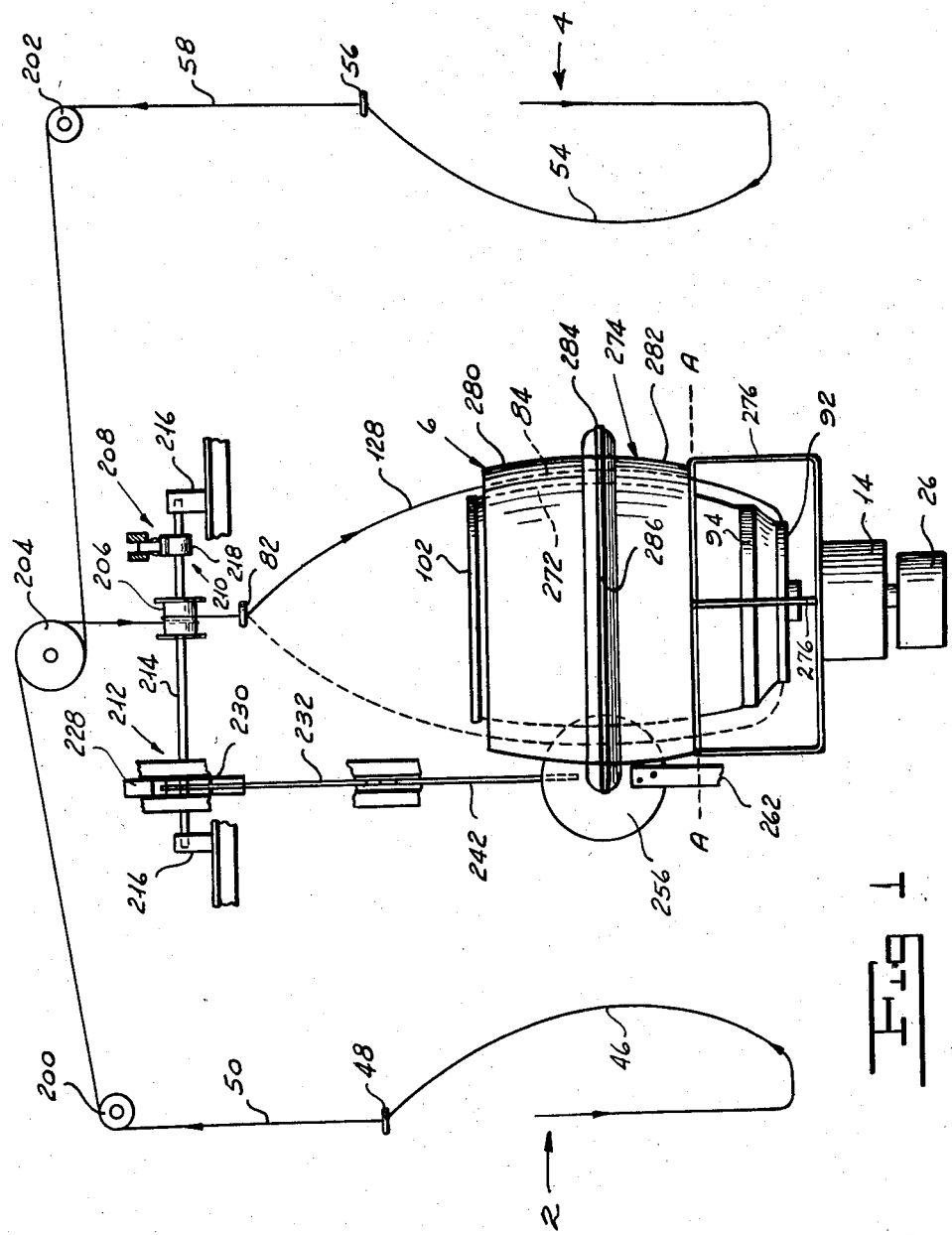

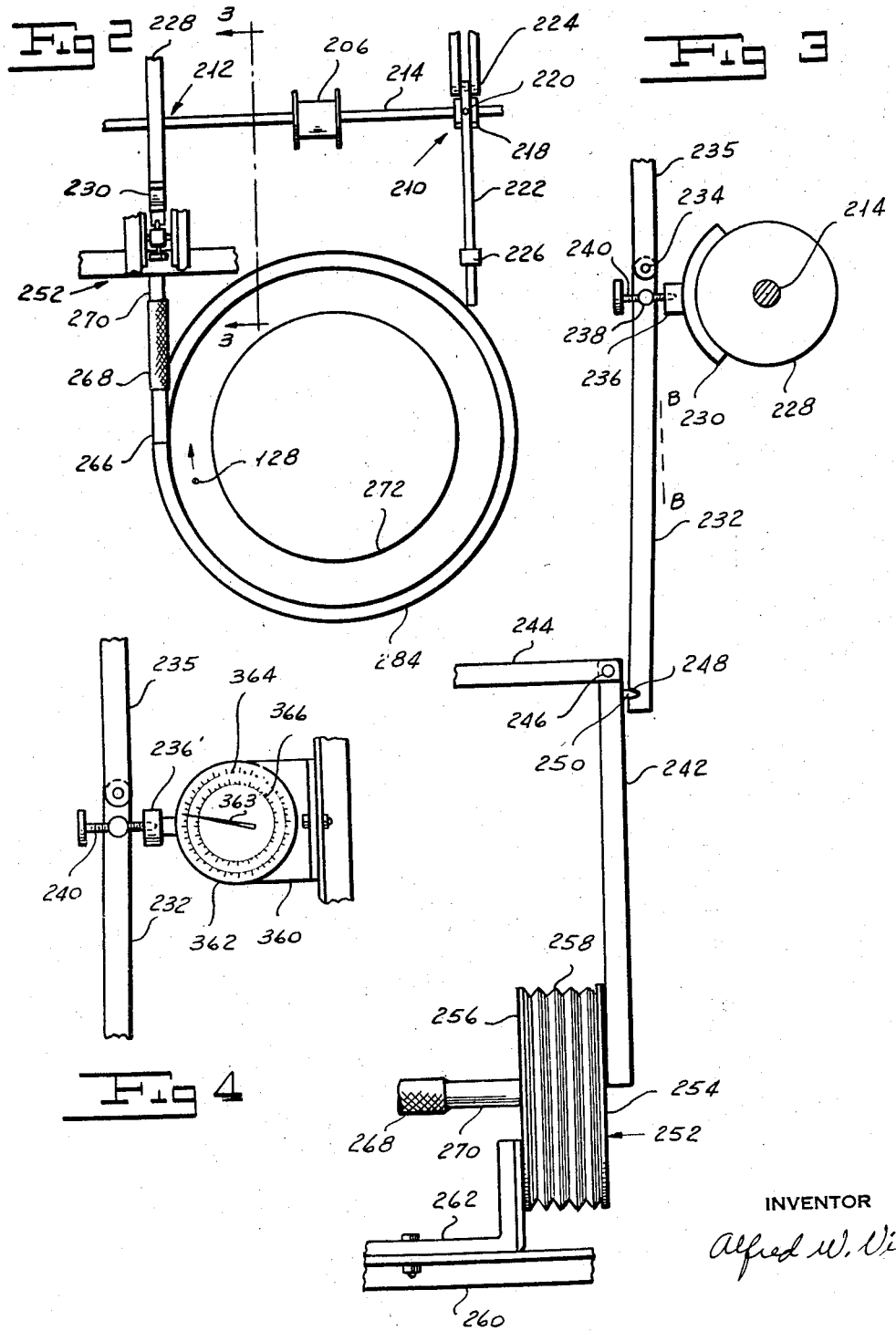

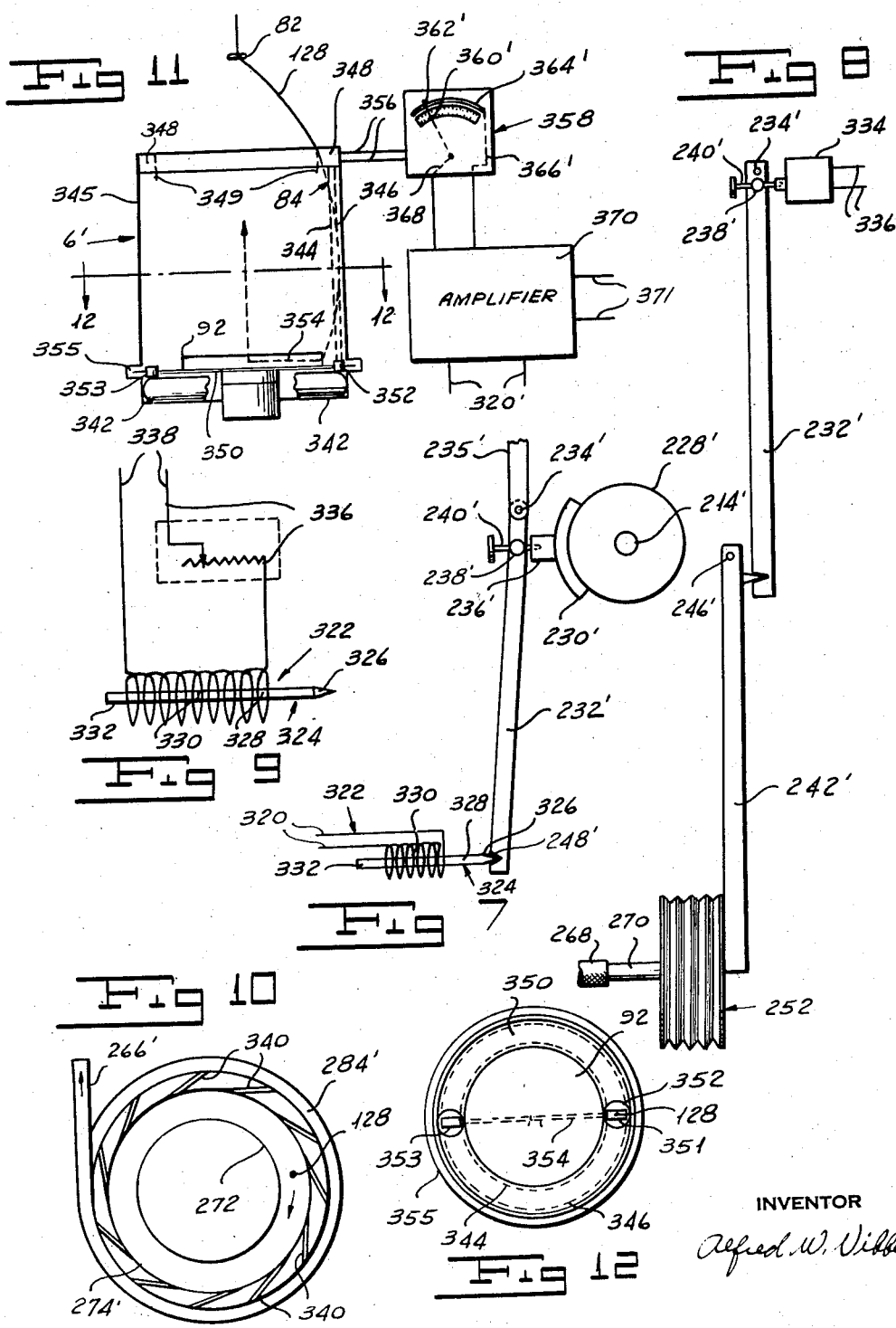

July 22, 1958     A. W. VIBBER     2,843,997
TWISTING SPINDLE BALLOON CONTROL
Filed May 8, 1951     10 Sheets-Sheet 5
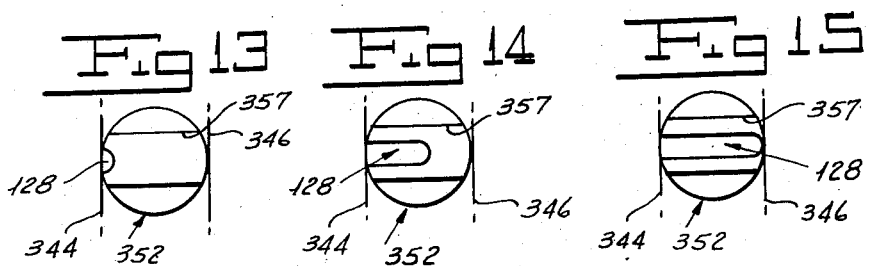
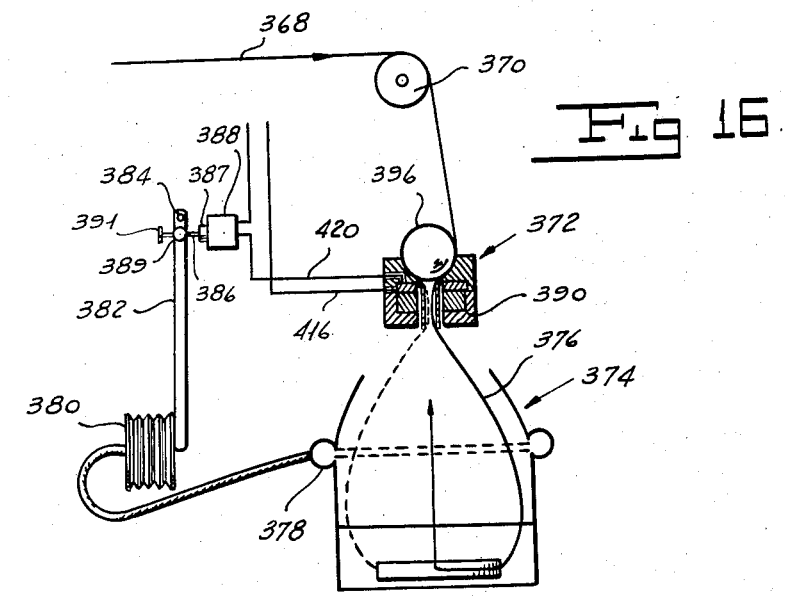
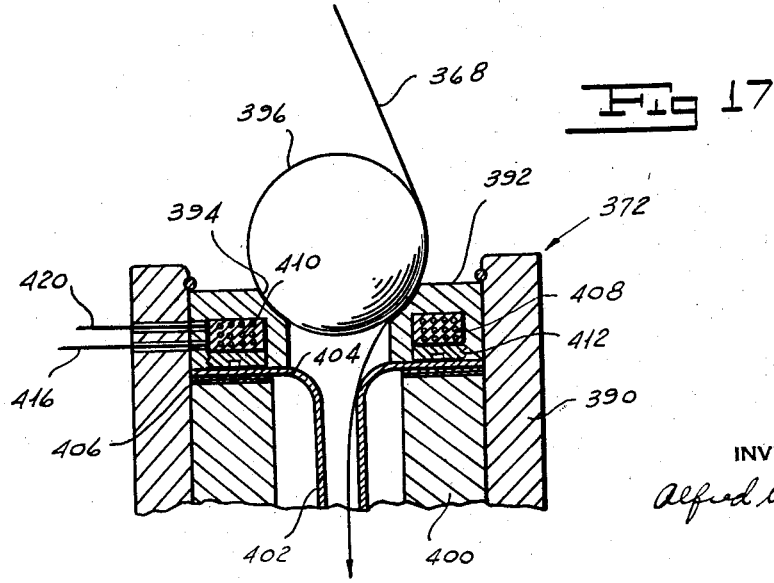
INVENTOR
Alfred W. Vibber

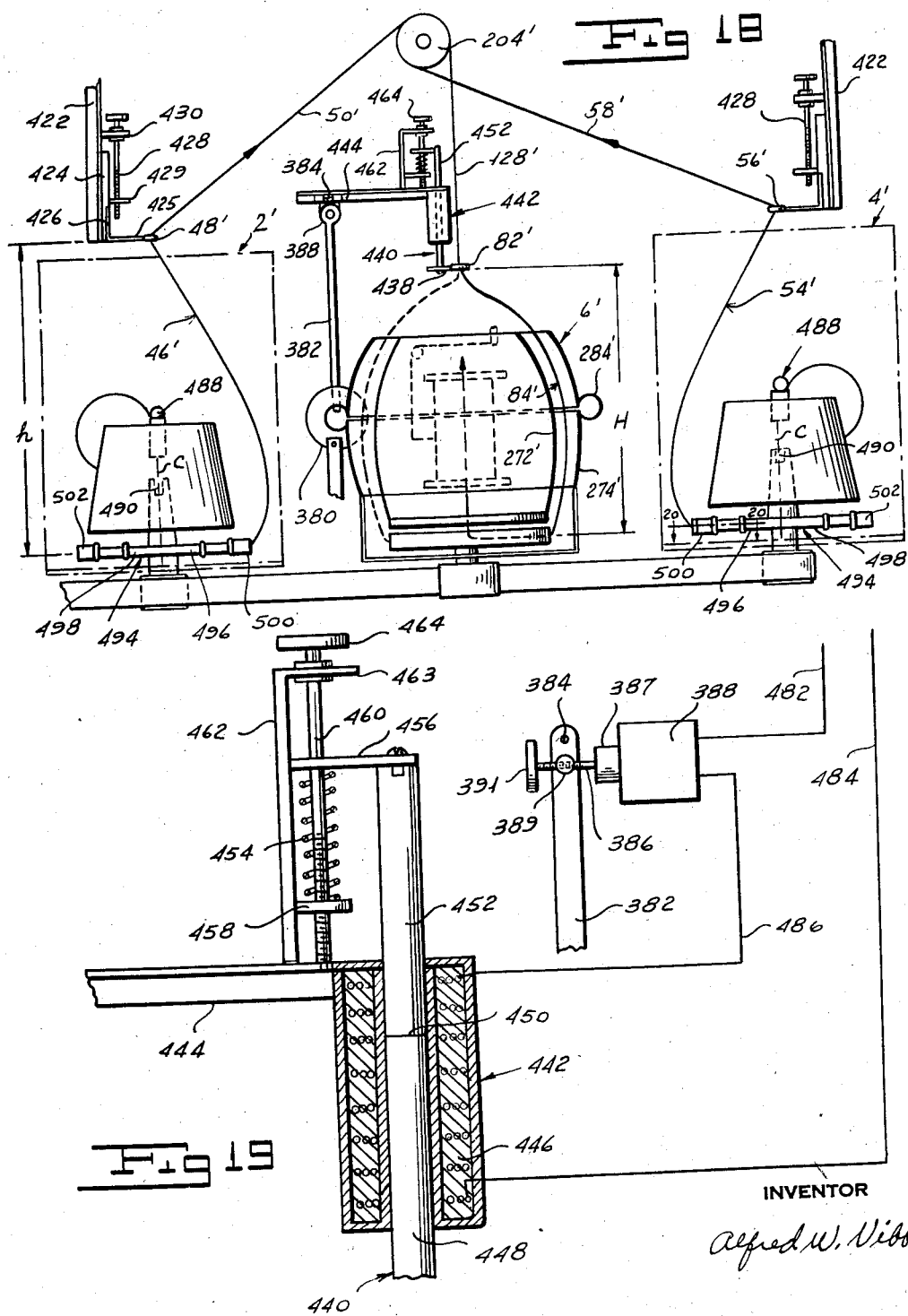

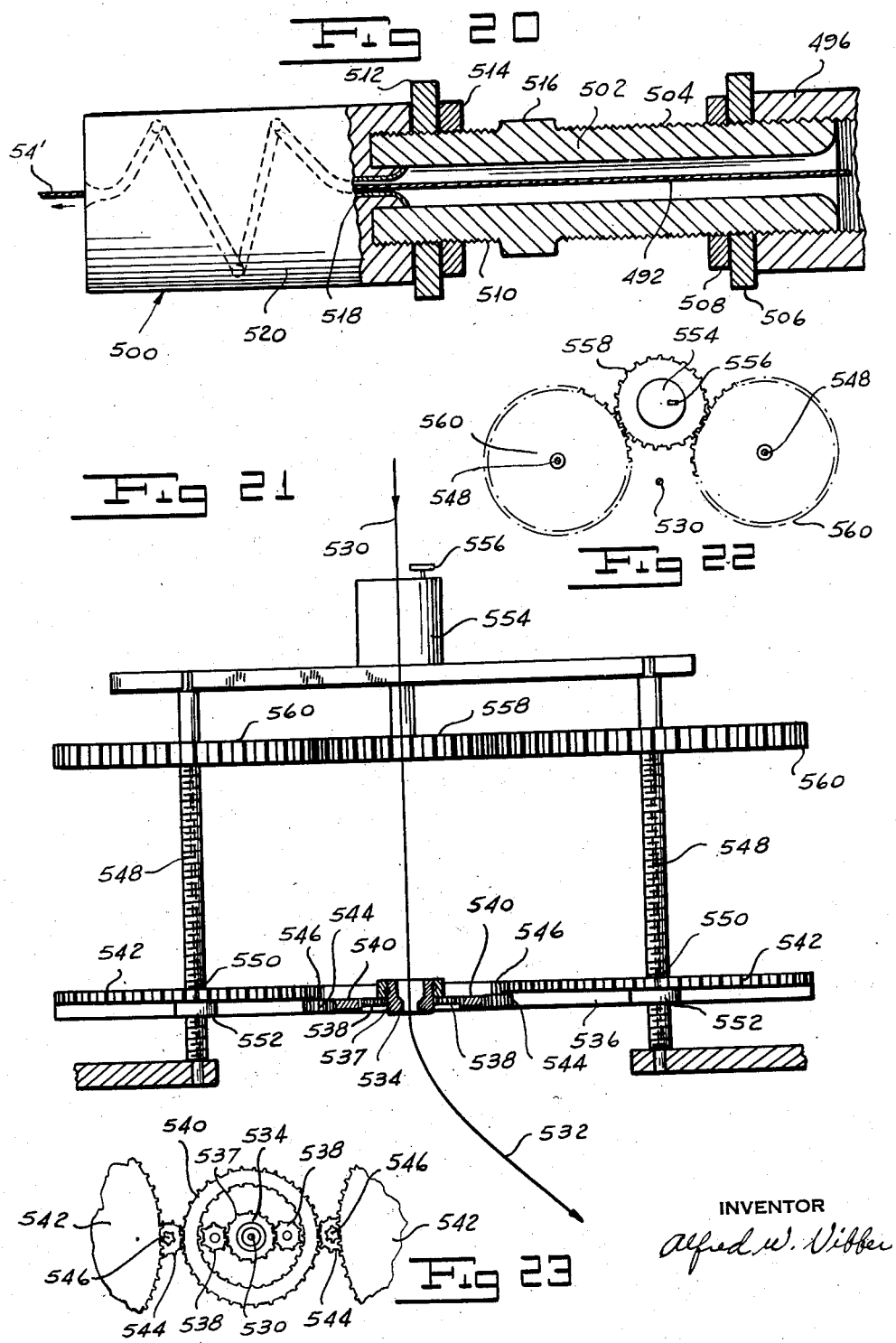

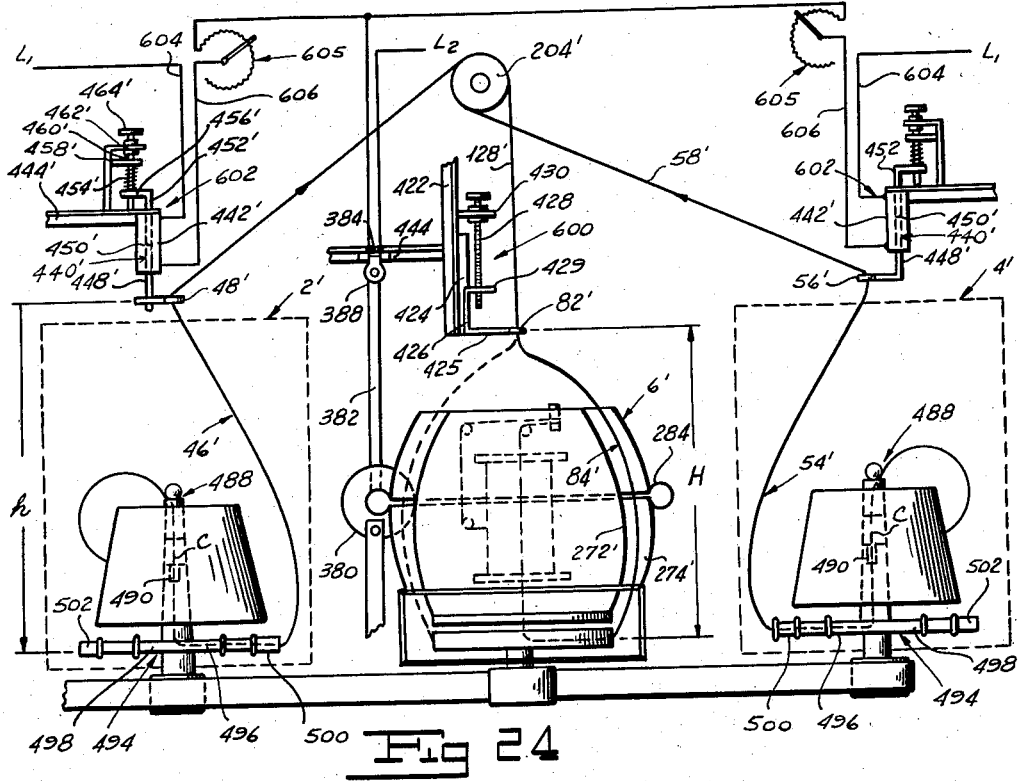
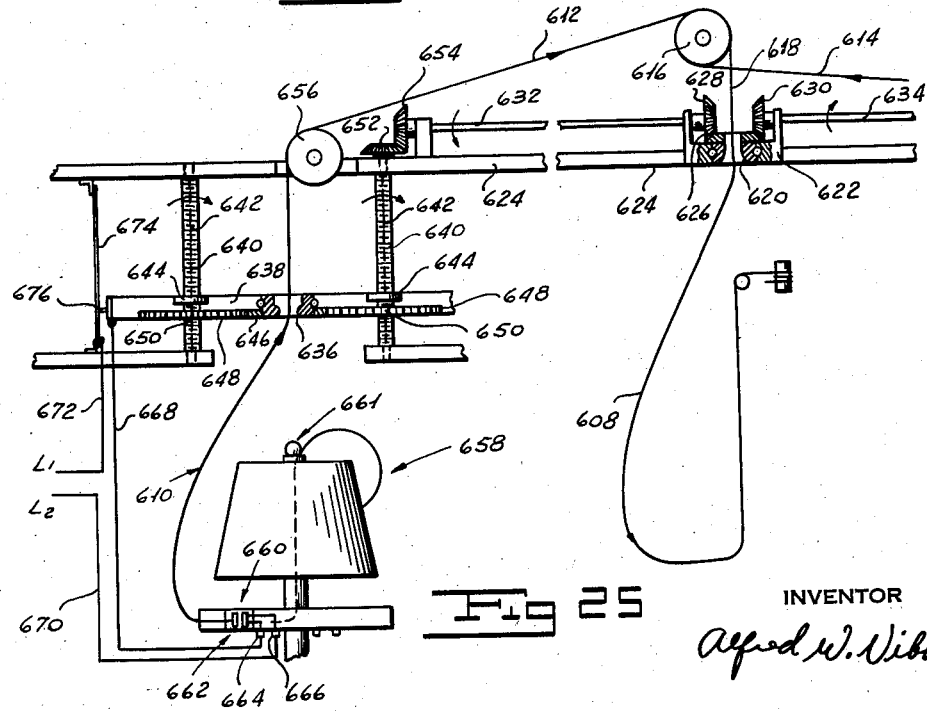

July 22, 1958 A. W. VIBBER 2,843,997
TWISTING SPINDLE BALLOON CONTROL
Filed May 8, 1951 10 Sheets-Sheet 9
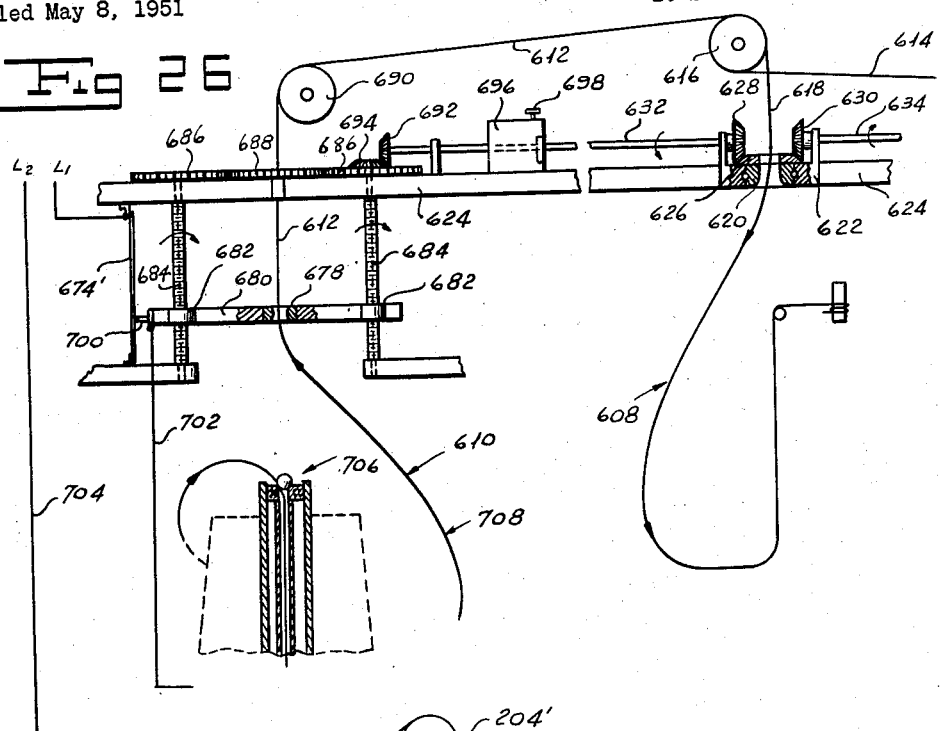
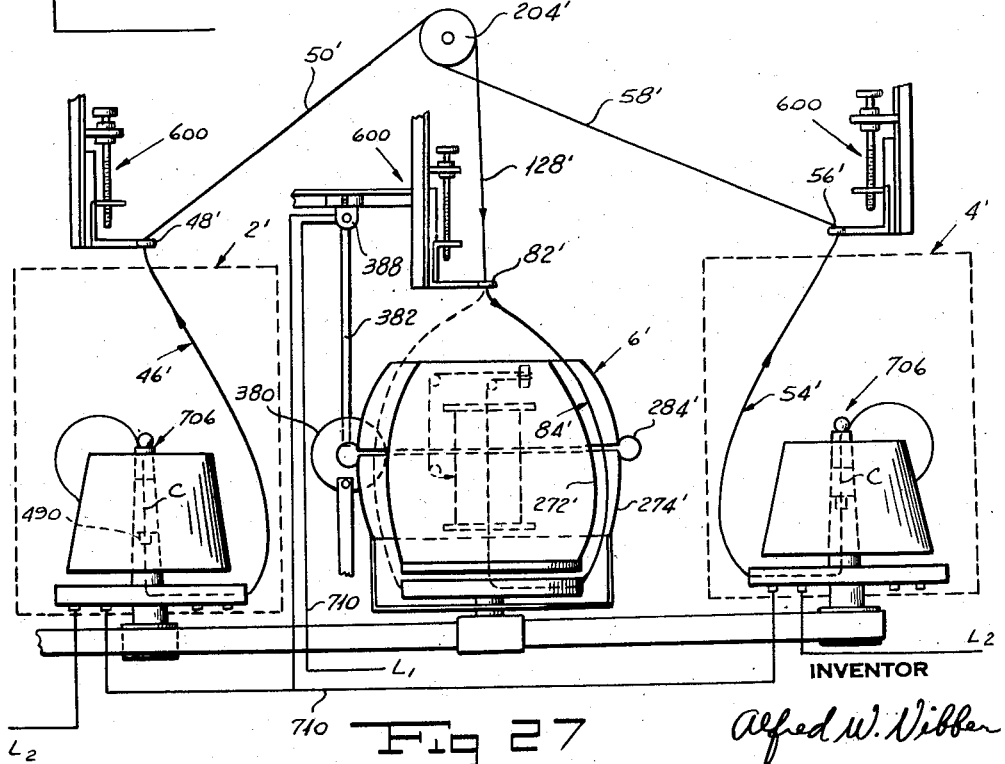
INVENTOR
Alfred W. Vibber

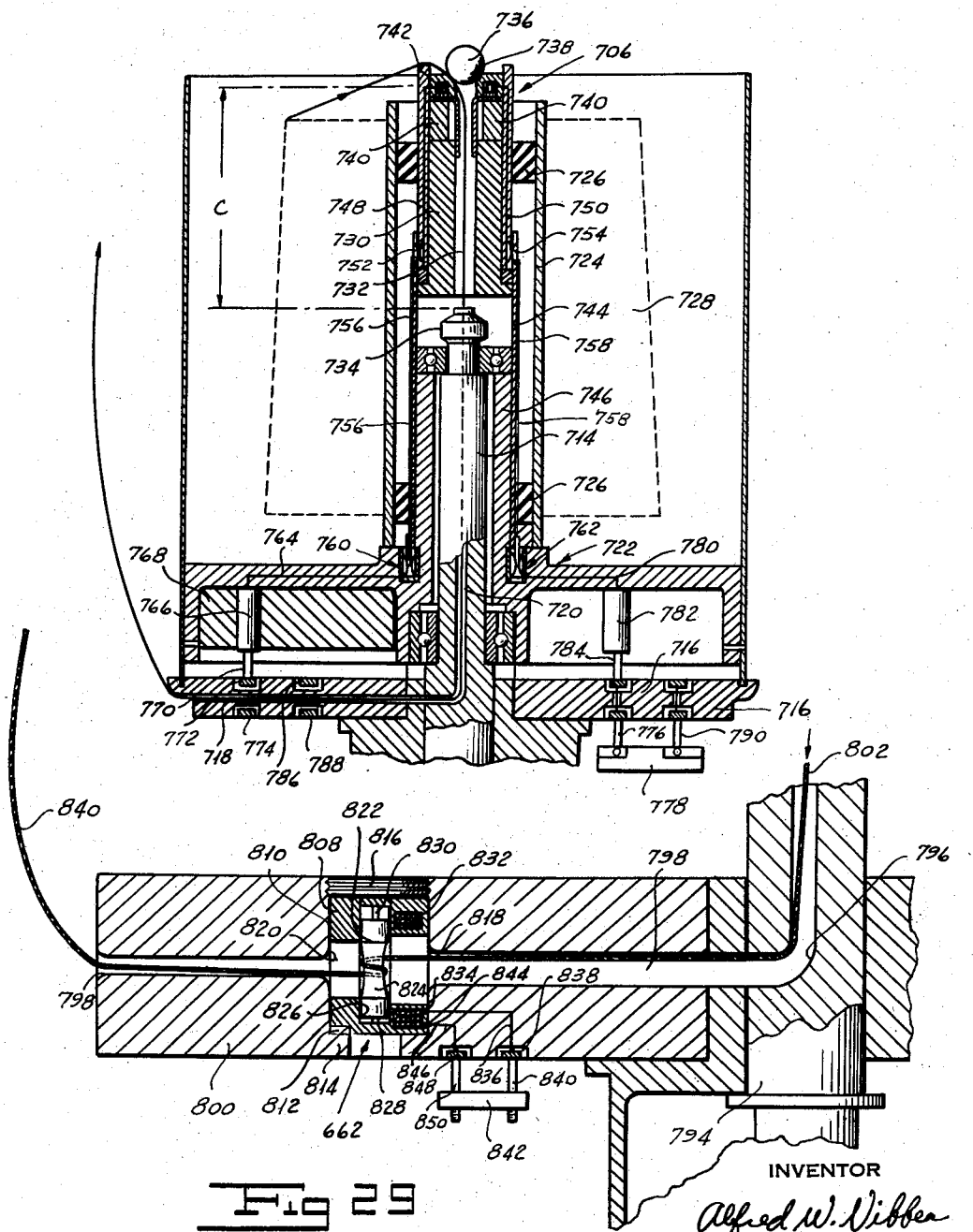

United States Patent Office 2,843,997
Patented July 22, 1958

2,843,997

TWISTING SPINDLE BALLOON CONTROL

Alfred W. Vibber, Ridgewood, N. J.

Application May 8, 1951, Serial No. 225,209

10 Claims. (Cl. 57—58.55)

This invention relates to a method of and an apparatus for continuously detecting changes in the diameter of, and/or the length of material in, a flying loop or balloon of elongated flexible material associated with a cabling and twisting spindle in a system including one or more singles twisters which feed their product to doubling means and thence to the cabling and twisting spindle, and for automatically and continuously controlling the diameter of such balloon in acordance with such changes.

This application is a continuation-in-part of application Serial No. 214,866, filed March 10, 1951, and bearing the same title.

In specific embodiments of the invention use is made, in the described system, of the continuous changes of the diameter of, and/or length of material in the cabling and twisting spindle balloon in controlling its diameter. It has formerly been attempted, in apparatus in which the tension produced in a balloon at the take-up twisting spindle has been balanced against the one or more balloons of the one or more supply spindles, to position a fixed tension imposing device between such supply balloon or balloons and the take-up balloon. Since the tension in such balloons (and thus in the spans leading from them and to them, respectively), does not stay constant, due to minute variations in the gauge and moisture content of the elongated flexible materials such as yarn, and thus of the weight of the material in each balloon, it is not possible to maintain substantially constant diameter of the take-up balloon by use of a tension compensating means which imposes a fixed retarding tension on such material.

It has also been attempted to employ a variable retarding means between the supply and take-up balloons, such retarding means being variable in response to the variations in tensions of the material travelling therepast. Such devices, however, have been complicated, difficult to maintain, and whereas, when they worked, they did maintain the size of the take-up balloon within fairly narrow limits, for appreciable lengths of time, they did so only as a fairly reliable concomitant result of imposing a substantially constant retarding force on the material entering the cabling balloon. Even with the described variable retarding means, however, the system did not insure or work primarily toward the maintenance of a substantially constant cabling spindle balloon size.

The described prior art variable retarding means between the supply and take-up balloons have employed as a tension detecting means positioned above the cabling balloon eye a resiliently mounted deflectable roll over which the combined, but as-yet-untwisted-upon-each-other, strands run in a salient path, whereby changes in tension in the strands are reflected in changes in the amount of deflection of the roll. Such changes in the amount of deflection of the roll are employed as the means for governing a variable strand retarding means acting upon the strands between the detecting roll and the cabling balloon eye. Because the strands running over the detecting roll come from the singles balloons and run into the doubles balloons, the tension in the first portion of the salient run of the strands, that approaching the detecting roll, reflects changes in the tensions in the entire system prior to such roll, including the singles balloons and singles back-tensions, and the tension in the second portion of the salient run of the strands, that leaving the detecting roll, reflects changes in the tension in the doubles or cabling balloon. Consequently the detecting roll, being acted upon by both such portions of the salient run of the strands, measures the sum of the tensions in each of such portions of the run.

When the tension in the first portion of the run is not absolutely constant, and it almost never is for any appreciable length of time because of at least minute variations in tension in the singles balloons, singles back-tensions, and in the system between the singles balloons and the first portion of the salient run, the described prior art tension detecting means does not give a true measurement of the tension in the strands in the cabling balloon. Such device also does not give a true measurement of balloon size, balloon diameter, or the length of the strands within the balloon, because added to the lack of true tension detection in the cabling balloon is the fact that, due to moisture content variation, the strands may very well have different weights per unit length in different portions thereof during the operation of the machine to fill one bobbin.

The apparatus of the invention insures a substantially constant cabling spindle balloon diameter by first, establishing a standard desired predetermined take-up balloon diameter, second, measuring variations in diameter of such take-up balloon from such standard diameter, and, third, employing such variations from the standard in diameter to vary the tension in the balloon thereby to insure the maintenance of the diameter of the balloons substantially constant.

The present invention is particularly concerned with the control of the diameter of, and/or the length of the material in, the balloon of the cabling and twisting spindle. Such control is effected by the continuous and instantaneous measurement of the diameter of, and/or length of material in, the balloon of the cabling and twisting spindle, and the variation of the size of the balloon in response to such measurement. The variation of the size of such balloon may be effected in a variety of ways, which include:

(1) The imposition of a retarding tension on the material entering the cabling spindle balloon, the retarding tension being made responsive to such measurement;

(2) The automatic variation of the height of the cabling spindle balloon in response to such measurement;

(3) The variation of the size of the singles balloons, and thus the tension imposed on the strands of material entering the cabling spindle balloon of the system, in response to such measurement.

The invention also relates to a novel system of singles twisters and a doubling cabling and twisting twister wherein a balance between the sums of the tensions of the singles twisters and the cabling and twisting spindle is effected at medial diameters of the singles and cabling spindles balloons at their medial diameters, without the necessity of the imposition of a retarding tension on the strands issuing from the singles twisters or at any location, including the gathering means, between the singles and cabling and twisting spindle balloons. The invention further relates to novel singles spindles incorporating therein either fixed or variable tension imposing means for making possible the described balance between the singles and cabling and twisting spindle, or doubles, balloons.

The invention will be more readily understood by reference to the accompanying drawings forming a part of the specification.

In the drawings:

Fig. 1 is a somewhat diagrammatic, over-all view, in side elevation of a twisting and doubling apparatus for forming cord from yarns, such apparatus embodying the preferred embodiment of the balloon control apparatus described as a means for controlling the diameter of the center, take-up, balloon;

Fig. 2 is a fragmentary view in plan of the apparatus in the vicinity of the center, take-up, spindle, showing the primary and secondary tension imposing means and their relationship with the center spindle;

Fig. 3 is a view in vertical section through the apparatus showing the secondary tension imposing means, the section being taken along the line 3—3 in Fig. 2;

Fig. 4 is a fragmentary view in side elevation of an alternative embodiment of the apparatus of the invention, employed for measuring the instantaneous diameter of the balloon at the center spindle;

Fig. 5 is a view, partially in side elevation and partially in vertical section, the section being taken along the axis of such center spindle;

Fig. 6 is a diagrammatic layout of an alternative embodiment of the means for controlling balloon diameter of the present invention;

Fig. 7 is a view in side elevation of an electromagnetic brake which may be employed as the secondary tension imposing means used in connection with the apparatus shown in Fig. 6;

Fig. 8 is a view in side elevation of a secondary tension imposing system, which, when employed in combination with the apparatus of Fig. 9, may be substituted for the secondary tension imposing device of Fig. 3;

Fig. 9 is a somewhat diagrammatic view of an electromagnetic brake applying solenoid and the wiring system thereof, which may be employed with the apparatus shown in Fig. 8;

Fig. 10 is a diagrammatic view in plan of an alternative air-column-establishing means employed in conjunction with the spindle whose balloon is to be measured;

Fig. 11 is a somewhat diagrammatic view of a still further embodiment of the balloon measuring and balloon control apparatus of the invention, such apparatus employing a photoelectric scanning mechanism;

Fig. 12 is a view in horizontal section through the spindle of Fig. 11, the section being taken along the line 12—12 in Fig. 11;

Fig. 13 is a view in plan of the optical slit and lens means 352 when the cord 128 in the balloon is just entering such slit from the inner boundary line 344;

Fig. 14 is a similar view of the slit and lens when the cord 128 occupies its medial position;

Fig. 15 is a similar view of such slit and lens when the balloon 84 has expanded so that the cord 28 lies along the outer boundary line 346;

Fig. 16 is a diagrammatic view of a still further embodiment of the balloon diameter measuring means and the balloon control apparatus of the invention;

Fig. 17 is an enlarged view in vertical axial section through the retarding tension imposing means shown in Fig. 16;

Fig. 18 is a somewhat diagrammatic view in side elevation of a still further embodiment of the three-spindle yarn twisting and doubling apparatus generally along the lines of that shown in Fig. 1, the apparatus of Fig. 18 varying the tension in the take-up balloon by variation of the vertical position of the guiding eye above the balloon;

Fig. 19 is a view partially in cross section of the eye positioning solenoid of Fig. 18 and of the wiring diagram for such apparatus;

Fig. 20 is a fragmentary view partially in side elevation and partially in horizontal cross-section through the active arm of the flyer of the apparatus of Fig. 18, the section being taken along the line 20—20 in Fig. 18;

Fig. 21 is a view in side elevation of a still further embodiment of the apparatus of the invention, such apparatus measuring the diameter of the balloon as a function of the expansive force exerted by the balloon on the eye at one end thereof, such measurement being employed automatically to vary the tension in the balloon by altering the height of such balloon;

Fig. 22 is a schematic view in plan of the apparatus of Fig. 21;

Fig. 23 is a schematic view of the gearing between the eye and the worms of the last disclosed embodiment;

Fig. 24 is a somewhat diagrammatic view of the system similar to that shown in Fig. 18, the tension in the material entering the cabling spindle balloon being varied by variation of the size of the singles balloons;

Fig. 25 is a somewhat schematic view, partially in vertical section and partially in front elevation, of a mechanism for measuring the balloon of the cabling spindle and for varying the size of, and back-tension imposed upon, the singles balloons;

Fig. 26 is a somewhat schematic view, partially in vertical section and partially in front elevation, of another embodiment of the mechanism of the invention for measuring the balloon of the cabling spindle and for varying the size of, and back-tension imposed upon, the singles balloons;

Fig. 27 is a somewhat schematic view in front elevation of a mechanism for measuring the diameter of the cabling spindle balloon and for varying the back-tension imposed upon singles balloons;

Fig. 28 is a view in axial cross-section through a singles spindle incorporating a first embodiment of the variable tension means at such spindle; and Fig. 29 is a fragmentary view in axial section through the flyer of a singles spindle, such flyer incorporating therein a second embodiment of the variable tension means of the invention.

The embodiment of the general combination of apparatus, to which the mechanism of the invention is applied, shown in Figs. 1, 2, 5, and 11, is generally of the type shown and described in the patents to Uhlig No. 2,487,837, issued November 15, 1949, and No. 2,654,211, issued October 6, 1953. Such apparatus consists of three spindles, spindles 2 and 4 being of the two-for-one singles supply type, the yarn being delivered therefrom in balloons 46 and 54, respectively, through guiding eyes 48 and 56, respectively, to combining or doubling and retarding tension imposing mechanism, from which it is delivered as doubled cord 128 into the infeeding balloon 84 of the central cabling and twisting spindle 6. Spindle 6 is likewise of the two-for-one twisting type, the combined threads receiving a first twist in their passage through the incoming balloon 84 and a second twist in their travel vertically axially through the center driving shaft of the spindle. Upon emerging from the top of such center hollow shaft, the cord is engaged by a positively driven capstan driven in synchronism with such shaft so as to supply the power to withdraw the cord from the balloon 84 to overcome the retarding tension of the tension imposing means and to withdraw the singles from their balloons 46 and 54. After leaving the capstan, the cord is wound upon a driven rotatable bobbin, being laid therein by a reciprocating traverse mechanism.

It is with the control of the diameter of the balloon 84 of the system shown in Fig. 1 with which the present invention, in those embodiments relating to balloon control, with the exception of the apparatus of Figs. 16 and 17, in the specific embodiments disclosed are concerned. Experience has shown that there is little, if any, difficulty in the control of the singles balloons when proper adjustment is made of the retarding tension imposing means at the top of each singles spindle. Difficulty has been experienced with control of the take-up balloon 84, wherein if the balloon is too tight it rubs upon the upper rub-ring 102 to the consequent damage of the cord, and, if such balloon is too loose, it rubs upon the outer guard member, if one is used, also to the damage of the cord. If no such guard is used, the balloon very quickly becomes entangled with the balloons 46 and 54 of the singles spindles if it expands to overlap such balloons.

The balloon control apparatus of the present invention is designed to hold the diameter of the take-up balloon within close limits, so that such balloon neither contacts the inner wear ring or inner guard nor contacts the outer guard or housing member.

In the embodiment of the apparatus shown in Figs. 1, 2, and 3, a singles supply spindles 2 and 4 may be driven at the same constant high speed and in the same direction by means of the belt entrained over the pulley of a motor (not shown) and over driving pulleys (not shown) on each of spindles 2 and 4. The central cabling spindle 6 is driven in the opposite direction at a slightly slower but constant high speed by contact of such driving belt with pulley 26.

To guide the air vortex employed as a balloon measuring means in preferred embodiments of the apparatus, concentric inner and outer guard members are employed at the upper portion of spindle 6 adjacent the largest diameter of the balloon 84. Such inner guard member 272 rests, as shown, upon the outer edge of the bottom, cage forming, member 94 which, as in the aforesaid Uhlig patent, is counterweighted at one side by means not shown so as to hold it, when it is positioned at a slight angle to the vertical, in stable but rockable position. The upper end of the inner guard member 272 is positioned over and thus stably held by the erstwhile rub ring 102. The outer guard member 274 extends to the top of the spindle and down to the level denoted by the line A—A, resting upon an open framework consisting of the fixed horizontal plate 278, the vertical wires 276, and the upper annular wire 278'. Such open work support for the bottom of the guard 274 affords the ready escape in a radial direction of the air vortex stirred up by rotation of the flyer member 92 and the upwardly dished guard member 96 affixed thereto, so that little, if any, of the air attributable to such vortex finds its way into the zone between the inner and outer guard members at the vicinity of the inner end of the air column forming a part of the diameter measuring and detecting means of the invention. Further details of the center spindle and of the balloon diameter detecting means will be described hereinafter.

The twisted singles 50 and 58 proceed upwardly from the balloons of their respective spindles 2 and 4, over the idle guide pulleys 200 and 202, respectively, and thence to the idle gathering pulley 204, from which the combined generally parallel but as yet untwisted-upon-each-other threads are led to the drum 206 of the tension imposing means. After passing around drum 206 several times, thereby to minimize slippage between it and the drum, the combined material 128 is led downwardly through the eye 82 and thence into the incoming or infeeding balloon 84 of the spindle 6. The tension imposing drum 206 is, in the embodiment shown, under the control of a primary retarding or braking means 210 and of a secondary retarding or braking means 212. Drum 206 is mounted upon the rotatably mounted horizontal shaft 214 which, as shown, is mounted in the pillow blocks 216 supported on appropriate portions of the machine frame. The primary retarding or braking means 210 is designed to impose, once the machine has been placed in operation and adjusted, a constant retarding torque upon the drum 206. The secondary retarding or braking means 212 is designed to impose upon the drum 206 a small medial tension when the balloon 84 is of the desired diameter, to impose a constantly increasing retarding force on the drum as the balloon 84 expands, and to impose upon drum 206 a constantly decreasing retarding force as balloon 84 contracts in diameter, thereby to maintain the balloon 84 of substantially constant diameter.

The construction of the primary retarding means 210 is shown more clearly in Fig. 2. As there shown, there is secured to the shaft 214 a relatively small brake drum 218. Pivoted to a portion of the machine frame, as shown in Fig. 2, by means of the pivot pin 224, is a brake lever 222. Pivoted to such brake lever at a position above brake drum 218 is a brake shoe 220, the brake shoe being held against the brake drum with an adjustable force by means of the slidable U-shaped weight 226 which may be positioned on the brake lever at predetermined adjustable distances from the pivot pin 224. Means 210, therefore, after once being adjusted and with the machine in operating condition will impose upon the drum 206 a constant retarding torque.

The secondary retarding means 212 comprises, as shown, a large brake drum 228, likewise affixed to shaft 214, a brake shoe 230 cooperating therewith (Fig. 3) and means to thrust such brake shoe against brake drum 228 with varying force, such brake shoe operating mechanism being under the control of a balloon diameter detecting or measuring device. The brake shoe operating mechanism, in the embodiment shown in Figs. 1, 2, and 3, consists of a first lever 232 pivoted at its upper end by the pivot pin 234 to the depending frame member 235. Secured to the upper end of lever 232 immediately below pivot pin 234 is the sidewardly projecting boss member 238 which threadedly receives therethrough the screw member 240 which, as shown, is provided with an adjusting handle. The inner end of screw 240 is rounded and smooth, being received within a slightly larger correspondingly shaped recess in the projection 236 on the rear of the brake shoe 230. The described mechanism permits the brake shoe 230 to be initially applied to the brake drum 228 with a known pressure resulting from the thrusting of brake lever 232 clockwise by adjustment of screw 240 to a position slightly off the vertical, as indicated by the vertical dotted line B—B in Fig. 3. Thus, under static conditions the secondary brake applies a small known retarding force to the drum 206 by reason of the effect of gravity upon lever 232.

To such small static retarding there is added, under running conditions of the machine, a retarding force which bears a direct, empirical, relationship to the diameter of the balloon to be controlled. In Fig. 3 such additional retarding force is shown as being applied by a second brake lever 242 pivoted by pivot pin 246 on member 244 of the frame of the machine. Immediately beneath pivot pin 246 there is provided on lever 242 a knife edge 250, the forward end of which is received within the somewhat more obtuse V-shaped recess 248. The thus described lever system allows an enormous multiplication of the force applied to the lower end of the lever 242 as compared to the force applied by the shoe 230. Since the various parts of the lever system are tightly thrust against each other, and since a more forceful application of shoe 230 against drum 228 requires substantially no motion of the lower end of lever 242, the application of an increased force at the bottom of such lever is almost instantly transmitted to the brake shoe.

In the embodiment of Figs. 1, 2, 3, and 5, such increased force on the bottom end of lever 242 is supplied by means of the bellows device 252, the forward wall 254 of which is rigid in character and is connected to such lever. The rear wall 256 of the bellows, likewise of rigid character, is secured to the bracket 262 which is adjustably attached to the part 260 of the frame member. The walls 252 and 256 of the bellows are connected by the pleated flexible side wall member 258.

Air under pressure is led to the bellows through the inlet tube 270 which is connected by means of the flexible hose 268 to the manifold 284 on outer guard 274 through the outlet pipe 266 thereof, as shown in Fig. 2. It will be apparent that increased pressure in the air column comprising the manifold 284, the delivery tube 266, hose 268, and inlet pipe 270, will be almost instantly transmitted to the bellows 252 which acts as a force multiplying device in accordance with the area of the forward wall 254. The manner in which the air pressure varies in such column in the manifold and connected tubing in accordance with balloon diameter changes and the mode of initial adjustment of the secondary and primary brake devices 212 and 208, respectively, will be discussed in detail hereinafter.

As an alternative to using the structure of Fig. 3 in conjunction with the detecting manifold or air column positioned in direct communication with and adjacent to the air vortex of the balloon to be measured and controlled, there may be substituted for the brake means 230, 228 of Fig. 3 a calibrated scale device 360 as shown in Fig. 4. Such scale device, which is mounted upon a fixed vertical portion of the frame of the machine, has a dial 362 and a rotating hand 363 cooperating therewith, such hand indicating the pressure exerted upon scale pan 236' by means of the adjustable pin 240, the rounded forward end of which fits within a suitable depression in the scale pan. The dial 362 is provided with two scales 364 and 366, the former being calibrated so that the hand 363 indicates directly thereon the speed of the air vortex in that portion in communication with the column of air in the detecting means, and the scale 366 indicating directly the pressure of the air in such column. This is possible on one dial, because with components including the air column, levers, and so on of fixed known size, the speed of that portion of the air vortex accompanying the balloon in communication with the inner end of the air column bears a definite empirical relationship to the pressure in such air column.

In its preferred embodiment, shown in Fig. 5, the portion of the air column defining means immediately adjacent the balloon of the twisting spindle takes the form of an annular manifold 284 which is an integral part of the outer guard member 274. As shown, substantially one-half of the manifold is formed as an upwardly open trough on the upper edge of the lower part 282 of the outer guard member, the upper portion of such manifold being formed as a downwardly open trough on the lower edge of the upper portion 280 of the outer guard. The upper portion of the manifold is formed (Fig. 5) on its outer edge with a downwardly extending flange and a shoulder inwardly thereof, so that the shoulder rests upon the upper edge of the lower half of the manifold, thereby supporting both the upper part of the manifold and the upper part 280 of the outer guard on the lower part of the manifold. A suitable gasket 286 may be employed at the thus formed joint in the manifold.

The inner edges of the top and bottom portions of the manifold are spaced when the manifold is assembled, to provide therebetween a continuous annular slot 288 which is in communication with the manifold. Such slot forms the inner end of the air column relied upon for both measurement and control of the diameter of the balloon, such air column including the air in the manifold 284 and that extending through delivery tube 266, flexible tube 268, and inlet tube 270, and the air in the expansible chamber 258. It will be apparent, that, by reason of the provision of the inner guard 272 and the outer guard 274, the air vortex accompanying the balloon 84 is confined to flow substantially annularly with such balloon. The air in such vortex is impelled centrifugally outwardly against the outer guard 274, which, by reason of its being in the shape of a truncated prolate spheroid, generally parallel to the balloon, tends to guide the air thrown from the vortex into the slot 288, rather than outwardly through the upper and lower open ends of such space between the inner and outer guards.

The pressure of the aforesaid air column having its inner end at the slot 288 affords a measurement of the speed of the air vortex accompanying the balloon 84 and also the distance of the material 128 in the balloon 84 from the slot 288. Such varying pressure in the air column can, therefore, be employed as a means for measuring the speed of such air vortex and consequently the speed of the balloon and can also, as above noted, be employed to impose suitable varying tensions on the material in the balloon, whereby to control the balloon, preferably to maintain the balloon substantially of constant diameter. The variation of air pressure in the air column upon variation in diameter of the balloon 84 has two causes (1) the material in the balloon acting within the space between the inner and outer guards acts a rudimentary centrifugal air blower. The amount of air which is forced into the slot 288 is naturally greater when the material 128 of the balloon lies closer to such slot than it does when it lies more remote therefrom. The second of such causes (2) is the fact that as the balloon 84 expands the material in it travels at an increased speed which is directly proportional to the diameter of the balloon. Consequently, the air vortex accompanying such balloon of increased diameter travels at a higher speed, and an air column in communication with the outer edge of such vortex naturally is subjected to a higher pressure, since, as noted, such pressure bears an empirical known relationship to the speed of the vortex. The combination of such two effects, therefore, gives a noticeable variation in pressure in the air column upon variation in the diameter of the balloon, the pressure increasing as the balloon expands and decreasing as the balloon contracts.

The change in pressure in such air column is transmitted almost simultaneously to the forward wall 254 of the expansible chamber 252. From there the force is transmitted through the lever system 232, 242, to the brake shoe 230. By suitable choices of the area of the wall 252 of the expansible chamber and of the mechanical advantage of the lever system 232, 242, there can be applied to the brake shoe 230 a force which is thousands of times greater than the pressure in the air column.

In a typical twisting operation the apparatus will be initially adjusted so that the primary retarding means 210 imposes, say, a retarding force of 1790 grams to the material passing around pulley 206 and so that, when the balloon 84 occupies a medial position in the space between the inner and outer guards, the secondary retarding means 212 will apply a retarding force of ten grams to the material passing around pulley 206, assuming that for the operation in hand a total medial retarding force of 1800 grams is required. The 1790 grams applied by means 210, of course, remains constant. Should the balloon 84, after the machine has reached a steady operating condition, then expand so that it becomes increasingly close to the slot 288, with a suitable choice of component sizes the retarding force applied to material 128 by means 212 will rise from ten grams to, say, twenty grams. This, in the particular operation described, will be sufficient to restore the balloon 84 to its medial position, or it may be sufficient to cause it to overrun such medial position. Upon such undue contraction of the balloon, the retarding force applied by means 212 will decrease to, say, five grams, whereupon the balloon 84 will become fuller and tend to regain its medial size. It is thus apparent that the described means affords a ready means for controlling the diameter of the balloon 84 so that it will remain substantially constant. Furthermore, the changes in retarding tension applied by means 212 will be gradual and will almost instantly accompany changes in the position of the balloon and thus changes in pressure in the air column. Consequently the balloon will tend to remain steady without much, if any, "hunting."

Although the above described apparatus is that presently preferred for both measuring the diameter of the balloon and for controlling such diameter, both such results may be attained by other apparatus which operates on at least generally the same principle. Thus, in the apparatus diagrammatically shown in Fig. 6, there is employed a device which both measures the diameter of the balloon instantaneously and controls its diameter by detecting the speed of a jet of air thrown off by the air vortex accompanying the balloon. In Fig. 6 the inner guard member is designated 272, the outer guard 274, and the manifold about such outer guard in the location of the maximum girth of the balloon formed by material 128 is designated 290. As shown, such manifold 290 which is generally of the same shape in axial cross-section at its inner edge as the manifold 284 in the first embodiment, is constructed in plan so that its peripheral wall is of spiral shape, the manifold having a substantially zero area in radical cross section at the point 292 and increasing to a maximum radial cross section at the point 294. Such shape approximates the shape of the housings of conventional centrifugal pumps, and facilities the flow of air from the jet 296, which is in communication with the manifold at its area of greatest cross section. Positioned in the jet 296 is the resistance wire of a conventional hot-wire anemometer. The jet of air in jet 296 impelled by the material 128 in the balloon varies in speed with the distance of such material 128 from the outer wall or guard 274, and thus from the slot at the inner edge of the manifold. Accordingly, the cooling effect upon resistance 298 by the travelling air in the jet affords a measurement of the distance of material 128 from such outer wall and consequently affords a measurement of the diameter of the balloon. Lead wires 300 extend from resistance 298 to the sensitive galvanometer 302 which is supplied by leads 304 from a suitable power source. The change in resistance of resistance 298 is indicated by the galvanometer needle 306, which cooperates with the fixed scales 308 and 309, scale 308 being calibrated to give directly the speed of the air in jet 296, and scale 309 being calibrated to read directly the pressure in such jet, which is possible since with a known size of jet the air speed and pressure bear known relationships to each other.

The needle 306 is provided with an electrically conducting extension 310 which slides upon a linear resistance member 312 positioned above the scales. Resistance 312 is connected at its right-hand end through wire 314 to the amplifier 318. The needle 306 is connected at its pivot through the wire 316 to such amplifier. As the speed of the air in jet 396 increases, therefore, the resistance in the input circuit of the amplifier decreases and accordingly the voltage output across the wires 320 of the amplifier, which is supplied through power leads 305, affords a direct measurement of the speed of the air in jet 296, the pressure of the air in such jet, and the distance of material 128 from the outer guard of the twisting spindle. The current output from wires 320 may be employed to operate a secondary braking or tension imposing means, whereby to maintain the diameter of the balloon of the spindle substantially constant.

A suitable alternative secondary tension imposing means, fed by output wires 320 of the apparatus of Fig. 6, is shown in Fig. 7. In such figure, parts of the apparatus which are similar to those in Fig. 3 are denoted by the same reference characters with an added prime. Since auxiliary power is available in this embodiment to operate the secondary tensioning imposing means, but one lever 232' is necessary. To press against the lower end of such lever there is employed the solenoid 322 which is connected to the amplifier of Fig. 6 through the wires 320. Solenoid 322 is provided with a plunger 324, the right-hand end of which is provided with a knife edge 326 which cooperates with the V shaped recess 248' in the lower end of lever 232'. The right-hand end of the plunger, designated 328, is of non-magnetic material, whereas the left-hand end 332 thereof, beyond junction 330, is of magnetic material.

Brake lever 232' is preferably adjusted so that it makes a small angle with the vertical, whereby when no current is impressed upon wires 320 the brake shoe 230' presses upon brake drum 228' with a small pressure due to the effect of gravity upon the system. When a current is impressed upon wires 320, generated by the system of Fig. 6 when the balloon occupies a medial position, the braking system of Fig. 7 will apply a medial retarding force to the pulley 206. Suitable adjustment of the primary retarding means 210 will thereupon result in a predetermined desired total tension when the take-up balloon occupies its medial position. When the balloon expands, the voltage in wires 320 increases, thereby impelling plunger 324 to the right in Fig. 7 and thereby adding to the retarding effect of the secondary braking means. When the balloon contracts, the voltage in wires 320 decreases and the secondary braking means imposes a smaller retarding force on the pulley 206. The apparatus of Figs. 6 and 7 therefore can be employed both for measuring the diameter of the balloon and also for maintaining it of substantially constant size.

A still further modification of the braking system which may be employed in the first described embodiment shown in Figs. 1, 2, and 5, is shown in Figs. 8 and 9. In Fig. 8 a compound lever system is shown similar to that shown in Fig. 3, similar parts being designated by the same reference characters as employed in Fig. 3 with an added prime. In Fig. 8 the lever system acts, not upon the secondary tension imposing means directly as in Fig. 3, but upon a carbon granule resistor 334, which is of conventional design and so constructed that substantially no motion of the plunger is necessary, the resistance across lead wires 336 therefrom decreasing in accordance with the pressure imposed upon the plunger of the resistor.

In Fig. 9 such resistor is shown in a circuit including the electromagnetic brake operating solenoid 332 of Fig. 7. Current through lead wires 338 is led to such solenoid, one side of the line proceeding through the resistor 334. It will be apparent that upon increased pressure in the manifold, and therefore upon the lever system 232', 242', an increased thrust to the right upon solenoid plunger 324 will be realized. Such solenoid plunger will be employed in connection with the braking system shown in Fig. 7, thereby maintaining the tension upon the incoming end of the balloon such that the balloon is maintained substantially constant in diameter.

In Fig. 10 there is shown an alternative embodiment of the manifold design. In such design the same inner guard member 272 is employed as in Fig. 5, the manifold 284 being replaced by the annular pipe 284' which is spaced radially of the outer guard 274'. Such outer guard is similar to in shape, but larger than, the inner guard 272. Connection between such pipe or manifold 284' and the outer guard 274' is effected by one or more tubes 340 which extend from the outer guard substantially tangentially thereto and in the direction of motion of the material 128 in the balloon. The lead-off tube 266' is disposed substantially tangentially to the manifold substantially in the same manner as the lead-off pipe in the embodiment of Fig. 5. It will be understood that the number and size of tubes 340 will vary according to the operation in hand, in some instances only a few or even one of such tubes being needed, particularly when the material 128 is of large diameter in cross-section. When but a few such tubes or only one is needed, the manifold 284 may be dispensed with, such one or several tubes being attached directly to the end of the take-off pipe 266'.

In Figs. 11-15, inclusive, there is shown an apparatus for controlling the balloon 84 of the take-up and twisting spindle 6' by photo-electric scanning means. Such device continuously measures the diameter of the balloon within certain predetermined desired limits, and, employing such measurements, controls an electromagnetically operated secondary tension imposing means to vary the tension on the entering end of the balloon, whereby to maintain the diameter of the balloon substantially constant.

The elongated flexible material 128 in balloon 84 enters such balloon through the eye 82, is drawn in through the flyer 92, and is coiled in the spindle after having been drawn upwardly from the axially hollow shaft therein in the same manner as it is in the spindle shown in Fig. 5. Spindle 6' is equipped with a cylindrical external guard 345 to the inner top surface of which, out of the path of travel of balloon 84, there is affixed the annular photoelectric cell 348, the bottom side of such annular cell comprising a light receiving lens, such lens being secured from reception of vagrant light by the aforesaid outer guard of the spindle and by the depending inner light shield 349. The light which falls upon cell 348 is derived substantially solely from the light source 342, which in this instance is an annular fluorescent tube positioned axially of cell 348 and at the bottom of the outer guard of the spindle. To the bottom of the flyer 92 there is affixed the circular shutter-forming disc 350 coaxial with the flyer, the outer edges of such disc protruding into the annular light trap 355 formed on the outer guard of the spindle. The main body of the disc 350 is imperforate except for the collimating lens system 352 positioned at one zone thereof so as to be aligned with the balloon 84 of the material traveling through the spindle. The actual opening through means 352 is substantially in the form of a rectangle having rounded ends, such opening being designated 357 and being shown more particularly in Figs. 13, 14, and 15. A compensating balancing weight 353 is positioned on the disc 350 diametrally opposite means 352, whereby the disc will rotate at high speeds in perfect balance. As the flyer 92 sweeps around carrying with it the balloon 84, the disc 350 similarly travels, the collimating lens means 352 causing a slit of parallel light beams to travel around the spindle, the inner border of such annular path of the light beams being designated 344 and the outer edge thereof being designated 346. The radial width of such light beam, that is, the distance between lines 344 and 346, is chosen as defining the range within which the diameter of the balloon may permissibly vary.

It is apparent from the above that the output in current from photo-electric cell 348 will vary markedly as the diameter of the balloon varies from the line 344 to the line 346. Thus, in Fig. 13, in which the balloon is shown protruding outwardly but slightly past the line 344, such current output of the photo-electric cell will be at a high value, since such cell receives continuously a beam of light from the portion of the slit 357 which is unobscured by the cord 128 of the balloon. When the balloon has expanded to a medial position, as shown in Fig. 14, the output current of cell 348 will decrease since the photo-electric cell receives light only from the unobscured portion of slit 357, such unobscured portion being markedly smaller than that in Fig. 13. When the balloon has expanded so that it coincides with line 346, as shown in Fig. 15, the elongated flexible material 128 will extend completely across the slit 357, thereby still further obscuring such slit and shutting off the light beam to the photo-electric cell, whereby the current output of such cell is at a minimum.

Such current variation in the output of the photo-electric cell may readily be employed as a means of measuring instantaneously the diameter of the balloon as it varies within the limits between lines 344 and 346. Thus, the output of such cell is led through wires 356 to the sensitive galvanometer 358, the needle 360' of which indicates a reading upon the scale, which scale may be calibrated directly in terms of diameter of the balloon. The galvanometer 358 may be made to control, through a suitable variable resistance and amplifier system, the secondary tension imposing device such as shown in Fig. 7, whereby the diameter of the balloon may be maintained substantially constant. Accordingly, there is positioned on the galvanometer above the scale a linear resistance 364' with which the extension 362' of the needle slidingly cooperates. The right-hand end of resistance 364' is connected by wire 366' to the amplifier 370, the other input wire 368 to such amplifier being connected to the needle 360. The amplifier, which is fed by power supplied from wires 371, when of suitable known design will produce at the output leads 320' a voltage which is directly proportional to the effective resistance of the variable resistor composed of parts 362' and 364'. Thus, the voltage across wires 320' will vary in accordance with variations in the diameter of the balloon 84, when the balloon is small the voltage across wires 220' being small and when the balloon is large such voltage being large. In employing the device of Fig. 11 to control the secondary tension imposing means, the apparatus of Figs. 7 and 11 are employed, wires 320 being connected to wires 320'.

It has been pointed out above that the general combination of singles twisters and take-up and cabling spindle shown in Fig. 1 depicts simply one embodiment of the apparatus wherein the present invention may be employed. In Figs. 16 and 17 there is shown a take-up spindle receiving a single elongated flexible material 368, the spindle designated 374 being of the two-for-one twisting variety. The material 368 is led down over the idle guiding pulley 370 through the variable retarding tension imposing device 372 positioned at the entering end of the balloon 376. The spindle 374 is provided with an outer guard similar to that employed in the embodiment in Fig. 5, and also with a continuous manifold presenting an open slot to the inside of the guard. The output from such manifold is led through a flexible hose to the expansible chamber or bellows 380, such bellows being operatively connected to the lower end of the lever 382 which, as in previous embodiments, is pivoted at its top at 384, and which through the medium of the adjustable pressure pin 386 functions to thrust against the plunger 387 of a carbon granule resistor 388. The resistor 388 is interposed in one of the lead wires 416 from a suitable power source, such wires leading to a supplementary wound field for the magnetically held ball 396. Ball 396, made of magnetic material such as steel, is supported in a partly spherical seat in the nonmagnetic main body 390 of the tension imposing device, being held therein by an annular permanent magnet of high permeability such magnet being designated 400. Initial adjustment of the magnet 400 toward or away from the ball 396 is effected by the interposition of suitable shims 406 therebetween. Added to the force with which the ball 396 is impelled downwardly into the seat, in addition to gravity, is the effect of the wound field 410 which is contained in the cavity 408 in the seat forming member 392. Cavity 408 is closed by the annular cap member 412 which as shown is screwed into such cavity. The elongated flexible member 368 is brought down between the ball 396 and the seat 392 thence down through the guide tube 402 and into the balloon 376. Because of the rotation of the upper end of the balloon there is imparted to the ball 396 a nutating effect, whereby the material 368 continually is shifted about the seat, wear of such seat and ball in any one position being thereby avoided.

The pressure pin 386 of the operating mechanism for the resistor 388 will be adjusted so that the combined effects of gravity, the magnet 400, and of the wound field 410 upon the ball 396 will give the device 372 the desired retarding tension imposing effect when the balloon 376 is of a medial diameter. Should such balloon 376 expand, increased pressure in the bellows 380 will thrust pin 386 against the plunger of resistor 388 more strongly, thereby decreasing the resistance through means 388 and energizing wound field 410 to an increasingly strong extent. Thereupon, of course, the downward pull upon the ball 396 is increased, and the diameter of the balloon will therefore be decreased. When such balloon decreases unduly in diameter, pressure against the plunger of the resistor 388 will be decreased, and accordingly the resistance through such resistor will increase. Thereupon the field strength of the wound field 410 will decrease, the ball 396 will be held in its seat less strongly, and the tension imposed upon material 368 will be decreased, thereby allowing the balloon 376 to expand. It can be seen that such device will thus maintain the diameter of balloon 376 substantially constant at all times.

In previously described embodiments of the balloon control apparatus of the invention, a tension imposing means has been shown at the entering end of the balloon, both in the three-spindle twisting and doubling apparatus and also in the singles twisting apparatus of Figs. 16 and 17. In the three-spindle apparatus such retarding tension between the balloons of the singles and the take-up balloon balances the tension of such single or singles balloons against the tension of the take-up balloon, the apparatus of the present invention adding or subtracting a slight amount of retarding tension at such point in accordance with variations in the diameter of the take-up balloon in order to maintain such balloon diameter substantially constant. In the singles twisting apparatus of Figs. 16 and 17 the variable tension thus imposed upon the entering end of the take-up balloon is for the sole purpose of controlling the balloon.

It has been found possible, with certain twist specifications and with certain materials, both to balance the balloons of the singles spindles against the take-up ballon and also to compensate for variations in diameter of the take-up balloon and to restore it to a desired medial diameter without the imposition of a retarding tension between the singles and take-up balloons. Apparatus for accomplishing such result is shown in Figs. 18, 19, and 20, wherein the basic parts of such three-spindle twisting apparatus are generally the same as those shown in Fig. 1 and are designated by the same reference characters as in Fig. 1 with an added prime.

The apparatus of Figs. 18, 19, and 20 generally includes means for adjusting the height of the singles balloons relative to the medial height of the take-up balloon, so that the tensions in the singles balloon balance the tension in the take-up balloon, no additional or compensating tension being necessary between the singles and take-up balloons if the diameter of the take-up balloon remains substantially at its medial value. Such apparatus includes means to compensate for variations in the diameter of the take-up balloon, and to restore such balloon to its medial value, by measuring or detecting variations in the diameter of the take-up balloon by apparatus of the invention previously described, and by varying the tension in the material forming such balloon of the take-up spindle by automatically varying the height of the take-up balloon in accordance with such measurements of variations of the balloon diameter, thereby to restore such take-up balloon to its medial diameter.

As shown in Fig. 18, the height, h, which singles guiding eyes 48' and 56' lie above the bottom of their corresponding balloon, somewhat exceeds the height, H, which guiding eye 82' of the take-up spindle 6' lies above the bottom of its respective balloon. The singles guiding eyes are adjustable vertically in their mounting on frame part 422 by means of the vertical guideway 424 mounted on such frame part, the slide 426 from which the eye holding arm 425 protrudes, such slide fitting within guideway 424, and the vertical screw 428. Screw 428 is journalled in the horizontal support 430 and is threadedly engaged with the horizontal projecting member 429 on the top of slide 426. It will be apparent that turning of screw 428 will allow the substantial adjustment of eye 48' toward or away from the spindle 2'. Identical structure is employed for vertically adjusting the guiding eye 56' for spindle 4'.

With certain specified twists of the material, and with certain weights of such material, it is possible, by suitable vertical adjustment of guiding eyes 48' and 56' and of the radius of the flyer, to balance the combined tensions of balloons 46' and 54' against the tension in take-up balloon 84', when such take-up balloon has its desired medial diameter. Gathering pulley 204' is, therefore, an idle pulley, imposing no retarding tension on the material passing thereover. The apparatus of Figs. 18, 19, and 20 incorporates means whereby the vertical position of take-up spindle guiding eye 82' may be automatically adjusted, in response to variations in the diameter of balloon 84', so that the tension of the material in such balloon is varied to restore such balloon to its medial diameter.

The eye 82' is mounted on an arm 438 which in turn is secured to the bottom of the solenoid plunger 440. The solenoid 442 is mounted on a frame part 444, as shown, such solenoid plunger being biased upwardly by the coil compression spring which, as more clearly shown in Fig. 19, abuts at its upper end the horizontal arm 456 secured to the upper end of plunger 440 and at its lower end abuts the adjustable abutment member 458. Member 458 is threadedly received on the threaded spindle 460, which is mounted at its top in the horizontal arm 463 on the bracket member 462 secured to the machine frame. Upon suitable turning of the spindle 460 by means of the hand wheel 464, the abutment 458 may be made to rise or fall, thereby to subject the plunger 440 to increased or decreased, respectively, counterbalancing upward bias. The plunger 440 is made in its lower portion 448 of nonmagnetic material such as brass, and is made in its upper portion, above juncture 450, of a magnetic material 452. It will be apparent that upon energizing the coil 446 of the solenoid 442 to a varying degree, the plunger 440 will be impelled downwardly against the action of spring 454. For a certain predetermined degree of energization of the coil 446 there will be, for a given adjustment of spring 454, a definite vertical position of eye 82' under operating conditions.

The voltage impressed upon coil 446 of the solenoid is supplied by, and is under the control of, a control mechanism which is identical with that shown as employed in Fig. 16. The expansible chamber, the lever, and the carbon granule resistor shown in Figs. 18 and 19 are, therefore, designated by the same reference characters as are employed for such parts in Fig. 16.

The supply circuit for such mechanism is shown in Fig. 19, wherein wires 482 and 484, leading from a suitable power source, are shown, wire 484 proceeding directly to the solenoid coil and wire 482 being led to the resistor 388. The other lead 486 from the resistor is connected to the other terminal of the solenoid coil.

The apparatus of Figs. 18 and 19 is adjusted so that the balloons 46', 54', and 84' are in balance as to tension when the take-up balloon 84' is of a medial diameter. Under such conditions, the eye 82' is subjected to the upward thrust of the upper end of balloon 84', the gravitational effect upon parts 82', 438, 440, and 456, and also to the upward thrust of the spring 454. Also acting upon eye 82', of course, is the force which the field 446 of the solenoid exerts upon plunger 440 when such field is energized to the degree corresponding to the degree of pressure imposed upon plunger 387 of resistor 388 by the expansible chamber and lever system 380, 382, which in turn are actuated by the pressure of the air column in manifold 284' generated by the balloon 84' in its medial position.

Should the balloon 84' expand, the air pressure in the manifold and expansible chamber will increase, the plunger 387 of the resistor will be subjected to increased pressure, the resistance through resistor 388, will decrease, and the field 446 of the solenoid will thus be more strongly energized. Accordingly, plunger 440 will be moved downwardly to a small extent, carrying with it the eye 82', and thereby decreasing the height H of the take-up balloon. Thereupon the tension of the material 128' in such balloon will decrease, due to the decreased length of material in such balloon, and thus such balloon will decrease in diameter. The reverse action takes place when the take-up balloon decreases in diameter from its medial diameter. The changes in tension in the material in the balloon 84' which are necessary to restore it to its medial position are small, and so such changes do not cause any operating difficulties at the singles balloons 46' and 54' once an over-all balance between the singles and the take-up balloons has been established with such take-up balloon at its medial diameter.

As is well known, the tension exerted by balloons 46' and 54' depends, in each instance, upon the weight of the material in the balloon and also upon the speed with which such balloon travels about its axis. In order to allow wider variations in these factors than would be permissible by the use of the vertically adjustable eyes 48' and 56' alone, spindles 2' and 4' are preferably provided with the novel flyer and tension arrangement shown diagrammatically in Fig. 18 and more specifically in Fig. 20.

It is usually necessary to provide in spindles 2' and 4' a tension means additional to the adjustable magnetic ball tensions 488 shown at the top of the spindles, both because such magnetic ball tension devices are limited as to the total force which they can impose upon the yarn, and also because the yarn, when engaged by such means, is in flat untwisted condition and therefore lacks the requisite strength as a whole to be engaged by a single tension imposing means contributing the total back tension effect required by the singles balloons. The material receives a first twist in the zone of travel C, thereupon entering the twisting guide 490 at the top of the spindle. After thus being first twisted, the material is stronger as a whole and may receive a second, larger, back tension, before it enters the singles balloon. In the embodiment shown, such additional tension is affected by means of the tension means 500 mounted on the arm 496 of the double-armed flyer designated generally 494. The other, balancing, arm of the flyer is designated 498, there being mounted on the outer end of such arm a non-operative, balancing means 502, so that the flyer is in dynamic balance.

As shown in Fig. 20, there is screwed into the internally threaded arm 496 of the flyer the end 504 of the adjustable sleeve 502. Such sleeve is firmly held in arm 496 by means of the two lock nuts 506 and 508. On the outer end of sleeve 502 there is threaded the tension device 500, the externally threaded end 510 of the sleeve being received in a threaded recess in means 500. The parts 510 and 500 are firmly held together by means of the lock nuts 512 and 514. To facilitate mounting and dismounting of the tension device and the sleeve on the arm, the threads 510 and 504, respectively, may be made right and left hand threads, the sleeve being conveniently turned by means of the hexagonal shaped unthreaded portion 516.

The tension device 500 incorporates therewithin the thread guiding tube 518, the tube having a smoothly curved passage therein alternately lying on one side of and then the other side of a radial line in the flyer. In the embodiment shown the tube 518 has a helical configuration having a sufficient number of helices therein, and the helices being of such pitch and length of travel, that tension device 500 under operating conditions imparts to the single twisted thread 492 entering it and passing through it into the balloon 54' a tension which, in addition to the tension imposed by the primary tension means 488, equals the back tension necessary to balance the balloon 54'. The thread 492 travelling through the tube 518 is, of course, subjected to bending in traveling through the helices of the tube, and is also subjected to centrifugal force which throws it strongly into engagement with the wall of the tube at the left in Fig. 20. The particular configuration of the tube 518 required for any twisting operation can readily be arrived at, and it is convenient to provide a series of tension means 500 having tension imposing effects in steps of, say, fifty grams. The gaps between such tension devices may therefore be readily filled by adjustment of the ball tension means 488.

Tension means 500 may conveniently be made by first providing a tube 518 of suitable hard smooth wear-resistant metal, bending it into the desired configuration, and then mounting it in a mold as an insert, after which the metal forming the main body 520 of device 500 may be cast about it.

It can be seen, therefore, that the flyer 494 with the replaceable tension means 500 thereon can, in conjunction with the adjustable eye 56', provide a singles balloon having the requisite weight of material in it and the required speed of travel about its axis, so that the sum of the tensions in the two singles balloons 46' and 54' will equal the tension in the take-up balloon 84' at its medial diameter.

In the various embodiments of the apparatus of the invention above described, those of Figs. 4, 6, and 11 have, as stated, means whereby both the pressure of the air column or jet and the speed of the air vortex accompanying the balloon may be read directly. In others of the described embodiments, that is, that of Figs. 1, 2, 3, and 5, that of Fig. 7, that of Fig. 8, and that of Figs. 18, 19, and 20, no means is provided whereby either the speed or pressure of the air jet, air column, or air vortex may be read. The balloon control apparatus of such embodiments, however, embody means for detecting one or more of such phenomena and means for transmitting the observed phenomenon to a balloon controlling means. Accordingly, all the described embodiments of the invention either "measure" the speed of an air column, "measure" the pressure in such air column, or both. It is also to be understood that in the embodiments of Figs. 6 and 11, should it not be desired to read directly the pressure in the air column or the speed of the air vortex, the hot wire of the anemometer and the output from the photoelectric cell, respectively, of such embodiments may be connected directly to a suitable amplifier which, in turn, leads to the variable braking or tension imposing means.

In the embodiment of the apparatus shown in Figs. 21, 22, and 23 there is employed a self-adjusting eye at the spindle the balloon of which is to be controlled. The eye adjusting mechanism is powered by frictional contact with the elongated flexible material passing therethrough, the eye being caused to descend when the balloon expands unduly, and to rise when the balloon contracts unduly, whereby the balloon seeks the condition wherein its diameter is the predetermined optimum diameter termed the "medial diameter." The eye adjusting means of this embodiment can be used with (1) the mechanism of Figs. 18, 19, and 20, replacing the air and electrically operated means for controlling the height of the cabling spindle balloon eye, (2) a three-spindle system wherein the gathering pulley is provided with a fixed brake, the device of this invention automatically governing the height of the cabling spindle eye in such system, and (3) the three-spindle mechanism set out in (2) above modified by the employment of a separate braking mechanism for each singles strand, the gathering pulley being idle and unbraked, the device of this embodiment of the present invention being employed as in (2) above.

The eye adjusting means of the embodiment of Figs. 21 and 22 will allow the necessary minor compensation in size and thus in tension of the take-up balloon to maintain it under control without requiring other adjustments of tension, as in the singles or elsewhere in the system. In other words, the slight variations in tension arising from adjustment of take-up balloon size to maintain it under control will not upset the overall general balance existing in the system.

The material 530 being twisted enters balloon 532 through eye 534. Such eye is rotatably mounted on platform 536. The amount of torque exerted on eye 534 varies as the diameter of balloon 532, since material 530 frictionally engages the bore therethrough, being pressed into engagement with such bore by the centrifugal force of the balloon. Such centrifugal force, in turn, depends on the weight and speed (diameter of the balloon) of the material in the balloon. Eye 534 carries on its bottom end the gear 537 which, through planet gears 538, drives ring gear 540 rotatably mounted in platform 536. Gear 540 drives the worm-driving gears 542 through the medium of gears 544 and 546. Vertical parallel worms 548, journalled in the machine frame as shown, pass snugly but freely through the bores in gears 542, the gears being keyed to the worms by keys 550 on the gear hubs. The worms are threadedly received in nuts 552 integral with the main body of platform 536.

Thus rotation of eye 534 by the material 530 will tend to turn the worms 548, causing platform 536 and eye 534 to travel vertically. The worms 548 are chosen of such hand that eye 534 when contacted by material 530 tends to drive the platform 536 downwardly. Rotation of worms 548 in the direction to carry platform 536 downwardly is resisted by a spring torque motor 554, which may be wound to varying degrees of tightness by key 556. Motor 554 is geared to worms 548 by means of gear 558 on the motor meshing with gears 560 keyed to the upper parts of the worms 548.

The torque motor 554 is preferably, although not necessarily, of such type that throughout the range of rotation of gear 558 in the operation required, the torque exerted on such gear 558 by the torque motor will remain substantially constant. The motor 554 may, however, deliver a torque which drops somewhat, over the working range, as it unwinds. Such motor will also work satisfactorily in the disclosed combination. It will be apparent that, when the balloon 532 is at its medial diameter and when spring torque motor 554, if it is of the indicated preferred type, is wound to a predetermined degree to give such substantially constant torque at gear 558 over the operating range, the platform 536 will seek a predetermined level at which the torque imposed upon worms 548 by the eye 534 balances the opposite torque imposed upon the worms by the torque motor 554. When such point of balance is reached, the material 530 at the top of balloon 532 will slip around in contact with the bore of eye 534, such eye remaining substantially non-rotating. Should the balloon 532 expand substantially, the friction between material 530 and the bore of eye 534 will increase. Thus the eye will then rotate in such direction as to tend to follow the direction of rotation of the balloon, and worms 548 will be rotated to lower platform 536 to a point where the torque imposed upon the eye, and thus upon the worms 548, balances the torque upon such worms exerted by the torque motor 554. The reverse action takes place when the balloon 532 contracts substantially. Thus the eye adjusting device is stable in operation, tending constantly to maintain eye 534 at, or to restore it to, the height at which the tension of the material in balloon 532 is of the desired predetermined value and the balloon 532 is of medial diameter. Because of the high ratio of speed reduction between the eye and the eye adjusting means, even minute differences in torque between those effective on the eye, caused by the torque motor and the frictional contact between the cord 530 and the eye will be reflected in rotation of eye 534 and thus its adjustment relative to the spindle flyer.

It is to be understood that the eye 534 may have a bore therethrough of a configuration similar to any one of the embodiments shown in the companion continuation-in-part application Ser. No. 223,189 (now abandoned), filed April 27, 1951, and bearing the same title, which is particularly directed to the self-adjusting eye shown in Figs. 21, 22, and 23 of application Serial No. 214,866. Thus the bore in eye 534 may be of such configuration that the elongated flexible material 530 will contact the entire length of the sidewall thereof throughout the entire variation in balloon size within permissible limits. It is preferred, however, that the configuration of the bore in the eye be such that the vertical height of the zone of contact between material 530 and the wall of the bore shall vary as the balloon diameter varies within permissible limits. Under such conditions, the change in torque exerted on the eye by the upper end of the balloon occurs for two reasons: (1) the described change in length of contact between the material 530 and the bore of the eye occurring by reason of the described configuration of the bore of the eye relative to the configuration of the upper end of the balloon, and (2) the change in pressure exerted on the wall of the bore of the eye by the material 530. As the balloon increases in size, the tension of the material in such balloon and consequently the pressure exerted upon the wall of the bore of the eye increases. Conversely, when the balloon decreases in diameter, the pressure exerted by the material on the bore of the eye will decrease.

It will be apparent, from the above, that the torque exerted upon the eye as a result of the above two factors bears a known, empirical relationship to both the tension of the material in the balloon and to the diameter of the balloon. Consequently the self-adjusting eye of the invention carries out a method wherein both the tension of the material in the balloon and the diameter of the balloon are measured as functions of such torque, the torque in turn automatically adjusting the position of the eye vertically with respect to the spindle flyer which creates and maintains the balloon in question, so that such balloon is automatically brought to, or returned to, the desired predetermined medial diameter, and so that, in the described three-spindle system, the sum of the tensions in the singles balloons is again in balance with the tension in the doubles balloon.

Although the apparatus and method of the invention have been described above in connection with the various detecting methods and apparatus as measuring the diameter of the balloon of the twisting spindle, and as controlling the balloon diameter in accordance with such measurement, it will be apparent that in the practice of the invention the measurement of the balloon diameter, with various known spindle components, will also give a measurement of the length of the elongated flexible material in the balloon. Thus, with a known constant spindle speed, a known flyer radius, a given speed of travel of the material through the spindle, a given height of the guiding eye above the spindle, and a given flyer and yarn passage configuration therein, when a given elongated flexible material of substantially uniform properties longitudinally thereof is twisted in the spindle, the balloon diameter and the length of the material in the balloon bear a determinable, fixed relationship to each other. Such relationship may readily be determined, with a given material and with the various spindle component factors constant, by taking ultra-high speed pictures of the spindle in operation, a succession of pictures being taken at a succession of balloon diameters differing from each other by small increments. The length of the material in the balloon corresponding to each balloon size may then readily be measured from the pictures, and a graph of such values made up.

Further, scale 366 on device 360 (Fig. 4), scale 308 on instrument 302 (Fig. 6), and the scale on instrument 358 cooperating with needle 360 (Fig. 11) may be calibrated, if desired, to read directly in terms of the length of the material in the balloon, instead of air pressure, air speed, and balloon diameter, respectively. As an alternative, the above scales may be calibrated to give simultaneous readings of any two or more of the above factors, including the balloon diameter and the length of material in the balloon.

Although the measurement of the air pressure and air speed accompanying the balloon has been shown in the embodiments of Figs. 1–6, inclusive, as being taken at the position of greatest girth of the balloon, it is obvious that such measurements may be made at various positions vertically of the balloon where the balloon has appreciable girth and preferably, of course, where no great possibility of error will occur due to the breeze stirred up by the flyer. As a consequence of such permissible variation in the location of taking such measurements, the term "measuring the diameter of the balloon" is not to be limted to direct measurement of the diameter of the balloon at its greatest girth, since measurement at other locations will, by calibration, yield an accurate measurement of the diameter of the balloon at its greatest girth.

It has been found, by stroboscopic observation of the singles spindles in apparatus such as shown in the above cited Uhlig patents, that under steady operating conditions the thread issuing from the flyer in a singles spindle will wrap around the spindle as much as 180° or more in its travel upwardly through the balloon into the singles balloon eye. Such behavior of the singles balloons is caused by the lack of sufficient back tension on the yarn entering the singles spindle to maintain the singles balloon in substantially a vertical plane. Such wrap-around of the singles balloons has rendered such balloons uncritical in their operation that is, tension variations in the system at or adjacent the cabling balloon have not caused wide variations in singles balloon diameter, compensation apparently being automatically accomplished by variation in the degree of wrap-around. Such action at the singles spindles has prevented the occurrence of much, if any, trouble at such singles spindles in the prior twisting machine, in spite of tension variations in the system. Such condition is not, however, altogether desirable because first, it does not permit the nicety of balance between the singles and doubles balloons which would be desirable, and secondly, because the necessary use of a retarding tension between the singles and doubles balloons has prevented the imposition of substantially a uniform tension upon each filament in the yarn from its twisting in the singles spindle, its doubling, and its being cabled and twisted in the doubles spindle.

Because the prior practice at the singles spindles has been so uncritical, it is possible to control the doubling spindle balloon eye, by apparatus such as shown in Figs. 21, 22, and 23, with no accompanying compensation of the singles balloons. Further, when additional tension has been gained at the singles balloons, as by use of manually operated singles balloon eye adjusting means such as shown in Figs. 18, 19, and 20, no back tension in addition to that initially imposed on the yarn as it leaves the package has been absolutely necessary in the singles spindles. Still further, it has been possible manually to adjust the diameter of the balloon flyer, as by an adjustable flyer such as shown in Figs. 18 and 20, thus also to increase the tension available in the singles balloons, without increasing the back tension imposed on the strand at such spindle, automatic variation in the amount of wrap-around at the singles spindles occurring as a result of such change of balloon height and/or flyer diameter.

Better control of the system as a whole, however, is obtained when a greater back tension than has heretofore been possible is imposed on the yarn in the singles spindles, in accordance with the invention, whereby the wrap-around of the singles balloons is markedly decreased or substantially eliminated. Such result is attained by the apparatus of Figs. 18 and 20, wherein a tensioning device 500 imposes a fixed additional tension on the material in the flyer in the path below the zone C wherein it is first twisted. When such tighter control of the singles balloons is used, and when an essential balance between the sums of the tensions in the singles balloons and the doubles balloon is used, no added tension being interposed between the singles and doubles balloons, two beneficial results are obtained: (1) a markedly better cord is secured, since the tension on each filament is substantially the same, at least after the first twisting operation on the yarn, throughout the entire twisting and cabling operation, and (2) under such conditions a balloon control can be used which employs a variation in tension in the singles balloons to control the size, diameter, and/or length of material in, the doubles balloon.

Systems employing such mode of control are shown in the following embodiments: (1) Fig. 24, wherein the size of the doubles balloon is controlled by variation of the height of the singles balloons, there being a fixed back tension employed in the singles spindles; (2) Fig. 25, wherein the size of the doubles balloon is controlled by variation of the singles balloons, variation in both the height of the singles balloons and the back tension on such balloons being employed; (3) Fig. 26, employing the same general system as Fig. 25, but with a second embodiment of apparatus for varying the height of the singles balloons; and (4) Fig. 27, wherein the heights of the singles balloons are maintained fixed after initial manual adjustment, the back tension on the singles balloons being automatically varied.

In Fig. 24 there is shown the same general combination of apparatus as that depicted in Fig. 18. Accordingly, the same reference characters are employed to denote the same elements as in Fig. 18. In Fig. 24, the center eye adjusting means is designated generally by the reference character 600, whereas the singles eye adjusting means is designated by the reference character 602. In this apparatus, the center or cabling balloon eye 82' is manually adjusted to the desired height by the mechanism 600, being left in such position during operation of the system. The means 602 for adjusting the heights of the singles eyes 48' and 56' are under the control of the cabling spindle balloon measuring and controlling apparatus shown, including the manifold 284', the expansible chamber 380, lever arm 382, and the carbon granule resistor 388. The solenoid 442' of each of mechanisms 602 is somewhat similar to that designated 442 in Fig. 19, except that in Fig. 24 the lower plunger part 448' is magnetic and the upper plunger part 452' above the boundary 450' is nonmagnetic. In addition, the coil spring 454' biases the plunger 440' downwardly, such spring acting between an extension arm 456' on the top of plunger 440' and the movable abutment 458' at its upper end, such abutment being adjustable vertically by means of the screw 460'. The singles eye controlling solenoids 442' are connected in parallel, with one wire lead 604 to each solenoid having in series therewith the resistor 388, wire 604 being connected to one side of the source of current, the other side of each of the solenoids 606 being connected directly to the other side of the current source. For the purpose of securing identical conditions at the eyes 48' and 56', there is included in the circuit feeding each of solenoids 442' an individually manually adjustable variable resistor 605.

Before starting the system shown in Fig. 24, the tension devices 488 of the singles are suitably manually adjusted, the diameter of the flyer is also suitably manually adjusted, and the particular secondary tensioning means 500 having a desired tension imposing effect is chosen, the individual rheostats 605 also being adjusted, so that when the balloon of the take-up spindle 6' is at its medial diameter the tension of the cord in such balloon equals the sums of the tensions in the balloons in the singles spindles 2' and 4'. Should the take-up balloon expand, the resistance through resistor 388 will decrease, the solenoids 442' will become increasingly energized, and their plungers will accordingly rise. Upon the rising of such plungers, the eyes 48' and 56' of the singles spindles also rise, giving the singles balloons greater thread accommodating capacity. Thereupon the tension in each of the singles balloons will increase, so that the sum of such tensions will tend to balance or slightly overbalance the tension in the take-up balloon, and will return the latter to its medial diameter. It is obvious that the reverse operation will occur should the take-up balloon contract unduly.

In Fig. 25 there is shown a means for effecting balance between the take-up and cabling balloon and the one or more singles balloons, employing devices functioning in somewhat the same general manner as that above shown in Figs. 21, 22, and 23. In this figure there is shown the cabling take-up balloon 608 and one singles balloon 610, the thread from the singles balloon being delivered at 612 to the idle, unbraked, gathering pulley 616. A corresponding thread 614 is delivered from another singles spindle, not shown in this figure. The combined, as yet untwisted-upon-each-other, threads are led downwardly at 618 through the eye 620 of the take-up balloon into such balloon 608.

The eye 620 is, as shown, rotatably mounted in a support 622 affixed to a horizontal member 624 of the machine frame. Eye 620 is provided on its upper end with a bevel gear 626, such gear meshing with a first bevel gear 628 affixed to the shaft 632 extending to the left of eye 620, and with a second bevel gear 630 affixed to shaft 634, such shaft extending to the right of eye 620 and being connected to the eye governing means, which is not here shown but which is the same as that for singles eye 636, of the singles spindle (not shown) which delivers thread 614. The mechanism of this embodiment so interconnects the doubles and singles eyes that, under balanced conditions, with both the doubles and singles balloons of the desired diameter, and thus so related that the sums of the tensions in the singles balloons equals the tension in the doubles balloon, the sum of the torques exerted on the singles balloon guiding eyes by their respective balloons will balance the torque exerted on the doubles balloon guiding eye by its balloon. The singles eyes are further so mounted that upon unbalance of such tensions, the mounting means for such singles eyes will move in a direction which is required to vary the height of the singles balloon, thereby to restore the balance in the system. In this device there is also provided means for automatically varying the back tension imposed on the material in the singles balloons as the height of such balloons is varied.

The guiding eye for the singles spindle balloon 610 is designated 636. Such eye is rotatably mounted, as shown, upon the vertically adjustable platform 638 which is carried by and adjusted by the two parallel worms 640. Each of such worms has therein a longitudinal slot 642, the worms passing freely through the platform 638 but being threadedly engaged in the nuts 644 fixedly mounted in the platform. On the bottom of the eye 636 there is affixed the ring gear 646 which meshes with the large gears 648, one such gear being associated with one worm and one with the other. Gears 648 are rotatably mounted in platform 638 and are retained therein against axial movement with respect to the platform. Each of gears 648 is provided with a radially inwardly protruding key member 650, the keys protruding into the respective slot 642 of the worms 640. It will be apparent, as in the case of the apparatus shown in Figs. 21, 22, and 23, that rotation of eye 636 will cause the platform 638 to move upwardly or downwardly along the worms 640, depending on the direction of rotation. Because the two worms 640 are connected or intergeared through gears 646 and 648, and since the gear ratio from the worms to the eye is not large, no further driving interconnection between the worms is required.

Connected to the upper end of one of the worms 640 is the bevel gear 652 which meshes with the gear 654 at the left-hand end of shaft 632. For the purpose of explanation of the mode of operation of the device, it will be assumed that the direction of the rotation of balloon 610, and consequently of the run of material 612 through eye 636 upwardly over guide pulley 656, is in such direction that the left-hand edge of such balloon approaches the reader, and that the direction of rotation of balloon 608 is in such direction that the left-hand edge of such balloon retreats from the reader. Under such conditions, the torque exerted upon eye 620 by balloon 608 will tend to cause shafts 632 and 634 and the worms 640 to rotate in the direction of the curved arrows. The torque thus imposed upon worms 640 of each of the singles balloon eye adjusting mechanisms by the eye 620 is opposed by the sums of the torques imposed upon such worms by each of the eyes 636. When the configurations of the bores through the singles eyes and through the doubles eye have been correctly chosen, and when the variable back tension on the singles yarn is correctly correlated with vertical adjustment of the singles eyes 636, a position of vertical adjustment of the singles eyes will be attained wherein the torques exerted upon the connecting system between the singles and doubles eyes will balance, eyes 636 and 620 will be at rest, and the singles and doubles balloons will be at their desired medial diameters, the sums of the tensions in the singles strands equalling the tension in the doubles balloon.

If the doubles balloon should expand, the torque on the doubles eye 620 will increase, thereby driving shafts 632 and 634 in the direction of the curved arrows. This, in turn, will cause the worms 640 to rotate in the direction of the curved arrows and will elevate platform 638 against the action of the smaller opposing torques exerted on the singles eyes 636. Such elevation of the platform 638 will continue until a point is reached where the opposing torques exerted upon the interconnecting shafts 632 and 634 by the singles and doubles eyes will again balance. The sum of the tensions in the singles balloons will accordingly have been increased, thereby balancing or slightly overbalancing the tension in the doubles balloon. If the doubles balloon tension is overbalanced, the system reacts in the opposite manner to reduce the tension in the singles balloons, thereby again seeking to restore the balance between singles and doubles tensions in the system.

Although, as above explained, a noticeable increase in the singles balloon tension can be effected simply by vertical adjustment of the guiding eye therefor, it is preferred to employ in the system of Fig. 25 an automatically adjustable back tension imposing means in each of the singles flyers, such means operating to increase the back tension upon the raising of the singles eye, and to decrease the back tension upon the lowering of the singles eye. One such back tension adjusting means is shown generally in Fig. 25 wherein it is incorporated in the flyer 660 of singles spindles 658 and acts in series with the first back tension imposing means, the magnetic ball means 661. The variable secondary tension device 662, shown in Fig. 25, will be more fully explained in connection with Fig. 29. It will suffice here to state that it is operated electro-magnetically, and that it is energized through the slip rings 664 and 666 affixed to the bottom of the flyer 660. Thus communication is continuously had with the tensioning means 662 through wires 668 and 670 connected to brushes contacting the slip rings 664 and 666. The wires are connected to a source of current $L_1$ and $L_2$ as shown, there being interposed in one side of the circuit a variable resistance which is responsive to the height of the singles eye 636 above the singles spindle. Such variable resistance, in the embodiment shown, takes the form of a linear resistance member 674 mounted, as shown, on insulating brackets affixed to the frame of the machine adjacent the platform 638. A brush member 676 is mounted on an insulated support on the end of the platform 638 so as slidingly to contact the resistance member 674. The wire 672 is connected at its upper end to the lower end of resistance member 674, the other wire, 668, being connected to the brush 676. The particular variable back tension means 662 illustrated is of such construction that the tension which it imposes on the material passing through the flyer increases as energization of the wound field of means 662 decreases. Accordingly, as eye 636 rises, the effective resistance in the circuit contributed by the active portion of resistance 674 and the brush 676 increases; such effective resistance decreases as eye 636 descends.

In Fig. 26 there is shown a further embodiment of the system wherein the tension in the singles balloons is varied to balance the tension in the doubles balloon. In such figure, parts of the apparatus which are similar to those shown in Fig. 25 are designated by the same reference characters. In this instance the singles eye 678 is fixedly mounted in the vertically adjustable platform 680, such platform being adjustably mounted on the worms 684, each worm being threadedly engaged in nut 682 affixed to the platform. The thread 612 proceeds upwardly through the eye 678 over the idle guide pulley 690 and onto the idle and unbraked gathering pulley 616, where it is combined with the other singles strand 614, coming from another singles spindle similar to the spindle 708 shown, the shaft 634 being connected to a singles eye adjusting means identical with that provided for spindle 708. The worms 684 of each eye adjusting mechanism are connected together, so as to roate in the same direction, by means of the gears 686 positioned on the upper ends of such worms and the intermeshing gear 688, placed at the rear of gears 686 in such position and of such diameter as not to interfere with the vertical travel of thread 612.

Shaft 632 extends through, and is intergeared with, the torque motor 696, such motor being wound to a desired predetermined degree by the key 698. To the left-hand end of shaft 632 there is affixed the bevel gear 692 which meshes with the gear 694 on top of one of the worms 684. Assuming the same direction of travel of the flyer creating balloons as was assumed in Fig. 25, the eye 620 will impose a torque upon shafts 632 and 634 and worms 684 in the direction of the curved arrows. This will tend to cause each of platforms 680 and eyes 678 to rise. Opposing such torque are both those contributed by the torque motor 696 and that imposed upon worms 684 by the upward thrust of platforms 680 caused by the upward travel of each of the singles strands through its eye. When the configuration of the bore through eye 620 is suitably chosen, when the pitch of worms 684 is likewise suitably chosen, and when the torque motor 696 is wound to the correct degree, the eye 620 will remain non-rotatable when the balloon 608 is of the desired medial diameter. Should such balloon expand unduly, however, the shafts 632 and 634 and the worms 684 will rotate in the direction of the curved arrows, thereby causing each of the platforms 680 to rise and causing the vertical expansion of each of the singles balloons. A point will be reached at which the sums of the tensions in the singles balloons again balance the tension in the doubles balloon, so that the system in general is in balance. Should the balloon 608 contract unduly, the reverse action takes place.

As in the case of the apparatus shown in Fig. 25, in Fig. 26 there is provided a means automatically increasing the back tension on the singles strands upon the increase in height of such singles balloons. Here again a linear resistance member 674' is employed, such resistance member cooperating with the brush 700 on the end of platform 680. The particular back tension device 706 in spindle 708 is of the type wherein under operating conditions the back tension increases as the device is increasingly energized. For this reason the upper end of resistor 674' is connected to line $L_1$. The two wires 704 and 702 proceeding from wire $L_2$ and the brush 700, respectively, are led to the variable back tension means 706 in a manner more fully to be shown in Fig. 28.

In the embodiment of the system shown in Fig. 27, the same general elements are employed as those in Fig. 24, and the same elements are correspondingly designated. In this instance the heights of the singles eyes 48' and 56' are manually adjusted, being left in their adjusted position during operation of the machine. The height of the cabling spindle eye 82' is likewise manually adjustable, eye 82' being mounted on a center eye adjusting means 600 which is the same as that shown in Fig. 24. In the apparatus of the present embodiment, variation in the tension in the singles balloons in response to variations in size of the doubles balloon is accomplished by adding increased back tension on the singles balloons. Such adjustable back tension imposing means 706 shown in Fig. 27 is specifically to be described in connection with Fig. 28. The balloon measuring and controlling apparatus shown in Fig. 18, including the manifold 284', the expansible chamber 380, lever arm 382, and the carbon granule resistor 388, detects changes in diameter of the doubles balloon and translates it into varying resistance at resistor 388. A suitable power source is connected through such resistor to tension devices 706 in the singles spindles, the wound fields of such tension devices being connected in parallel. One wire 710 has resistor 388 in series therewith, such wire being connected to one side of the field of each of the tension means 706. The other wire, connected to a suitable power source (not shown), is led in parallel to the other side of the field of each of the tension devices 706.

The resistance through resistor 388 decreases as the diameter of the balloon at spindle 6' increases. The tension imposing effect of devices 706, when the singles flyers are in operation, increases as they are increasingly energized. Accordingly, in the described system, as the diameter of the doubles balloon at spindle 6' increases, the back tension imposed upon the singles strands increases, so that a balance in tensions is again restored to the system. Upon undue contraction of the doubles balloon, the tension imposed on the singles balloons will decrease automatically, thereby again restoring the tensions in the system to balance.

In Fig. 28 there is shown a singles supply spindle incorporating therein a first embodiment of the automatically variable back tension imposing means. Such spindle includes a generally upright rotatable shaft 714, such shaft mounting thereon at right angles to the axis thereof the flyer 716. The flyer has, radially therethrough in one location, a passage 718 for the yarn, such passage communicating at its inner end with the axial yarn passage 720 in shaft 714. Floatingly mounted on the shaft, so as to remain essentially non-rotatable during operation of the machine, is the member 722 forming a support for the package 728. Such package is supported on core member 724, which is held in position coaxial of shaft 714 by the bottom and top spacer members 726. The tension device is designated generally by the reference character 706. Such tension device has a main body 730, such body having an axial passage 732 therethrough. Body 730 is held in position by the aforementioned top spacer member 726 and by the sleeve 744, the sleeve being made of non-conducting material such as molded plastic, such sleeve snugly fitting, at its bottom end, about the central tubular portion 746 of member 722, and receiving at its upper end the lower end of body 730 of the tension device.

Positioned on top of shaft 714 and below the body of the tension device is the yarn twisting guide 734. The first twist of the yarn takes place in the zone, designated C, below the first tension device, composed of the ball 736 and the ball seat 738, and the twisting guide 734. The ball 736, which is made of magnetic material, is held in the seat 738 by the permanent magnets 740, the distance between such magnets and the ball being variable, as by the interposition of shims between the magnets and the ball seat. Within the ball seat providing member, which is made of non-magnetic material, and immediately below the ball seat there is provided a wound field coil 742. Such wound field coil is variably energized in the manner previously explained, connection between such wound field coil and the source of energization being effected as follows:

The body 730 of the tension device is mounted in and retained in the sleeve 744 in fixed angular relationship therein as by providing a radial pin (not shown) on the bottom end of the body 730 and a corresponding slot (not shown) on the top of sleeve 744. Such pin and slot, being conventional, are not shown. A first wire 748 leads from the wound field coil 742, and extends downwardly through a bore in the body 730 of the tension device to a first spring terminal 752 on such body. A similar wire 750, to the other side of the field coil, extends downwardly through the body 730 to the spring connector 754 on body 730. A pair of wires 756 and 758 are disposed on the outer surface of sleeve 744 at diametrically opposite zones, such wires being connected at the top of the sleeve to inwardly projecting spring terminals cooperating respectively with terminals 752 and 754. Wires 756 and 758 lead downwardly to the lower end of sleeve 744, where they are connected to pins affixed in insulating mountings on the sleeve, such pins fitting within socket members, as shown, which are insulated from member 722, in which they are mounted. The first of such plug connections is designated 760 and the second 762. A conductor 764 leads through member 722 from plug connection 760 to the left as shown in Fig. 28, where it connects with a first insulated brush holder, which, in this instance, extends through the weight 768 which tends to prevent member 722 from rotating. A similar conductor 780 leads through member 722 from plug connection 762 to the brush holder 782. The brush 770 in holder 766, and the brush 784 in holder 782, cooperate, respectively, with slip rings 772 and 786 mounted in insulating channel members on top of the flyer 716. Slip rings 774 and 788 are located on the bottom of the flyer member opposite slip rings 772 and 786, corresponding pairs of slip rings being connected to each other. Connection may then readily be made to the bottom slip rings, as by brushes 776 and 790 mounted upon the insulating supporting block 778 affixed to the machine frame.

It will, of course, be obvious from the above description that as field coil 742 is increasingly energized, the force with which the ball 736 is pulled downwardly to the ball seat 738 increases and that the tension imposed upon the as-yet-untwisted yarn being pulled off the package and proceeding downwardly through the tension device between the ball and its seat is increased. The tension device shown in Fig. 28, therefore, can in certain instances furnish by itself the necessary back tension compensation required in those systems employing variation of the singles balloons size to maintain general balance of tension through the system.

In Fig. 29 there is shown a portion of a singles supply spindle incorporating in its flyer a secondary back tensioning means acting upon the first-twisted elongated flexible material 802 proceeding downwardly through the axial passage 796 in spindle 794 and thence radially outwardly through the flyer passage 798. The flyer 800 incorporates therein the secondary tensioning device, generally designated 662, which acts on the material prior to its entry into the balloon 840. For convenience, the tensioning device 662 is formed as a readily movable unit, such unit having a main body 808 of generally circular cylindrical shape exteriorly thereof, such main body 808 fitting within the correspondingly shaped cavity 810 in the flyer 800. The axis of such cavity extends parallel with the axis of the spindle, and is in such location as symmetrically to intersect the passage 798. The opposite arm of the flyer is equipped with a corresponding dummy member (not shown) for the sake of dynamic balance.

Body 808 is held from rotation in cavity 810 by means of the key 812 at the bottom of the cavity, such key fitting within a correspondingly shaped channel in body 808. The central portion of the seat forming member 814 of the flyer is open, as shown, to allow the pushing of the tension member upwardly upon its removal. The tension member is held in the cavity by means of the cap 816 which, as shown, is screwed into the threaded portion at the upper end of the cavity.

The portions of passage 798 adjacent the cavity 810 are flared, as shown at 818 and 820. A passage 822 extends through the body 808 of the tensioning device in matching relationship with the flared ends 818 and 820 of the flyer passage. A slightly elliptical bore 826 is provided in body 808 parallel to the axis of the spindle, as shown, the major axis of the ellipse lying in a direction radial of the flyer. A tensioning roller 824 fits within bore 826, such roller having its main body of a diameter such that the end portions of the rollers snugly engage the bearing providing surfaces on the bore wall remote from the axis of the spindle. The roll is held in place, as shown, by the bottom roll supporting nib 828 and the top roll locating nib 830, such latter nib being contacted by the bottom surface of cap 816.

It will be apparent that, under operating conditions, with the flyer 800 rotating at high speed, and with the material 802 looped at least once around roller 824, a marked tension will be imposed upon the material by the roller. Such result follows because the roller 824 will be thrust with appreciable force against the outer bearing seats by reason of the centrifugal force imposed upon it, and because the one or more loops of the material 802 about the roller will engage such roller in substantially non-slipping relationship.

It will be apparent that the tension imposed by means 806 will be varied if the roller 824 is subjected to a radially inward force which tends to oppose the centrifugal force acting upon it, thus to alter the frictional retardation upon the roller imposed by the bearing seats. Such change in the frictional retardation of the roller is effected by the wound field coil 832 which selectively acts upon the roller. The roller 824 is made of magnetic material, the main body 808 and the cap 816 of the tension device being made of non-magnetic material such as brass, bronze, or the like. Energization of field coil 832, therefore, will tend to counterbalance the centrifugal force acting upon the roller, the amount of such counterbalancing effect being determined by the degree of energization of the coil.

One lead wire from the coil is connected to an outwardly directed spring terminal 834, the other lead wire being connected to a similar spring terminal 844, such terminals on body 808 cooperating with terminals fixed in the bore of cavity 810. The tension device 806 may therefore be quickly removed from the flyer or inserted in place, the electrical connections thereto being broken and made respectively at the same time. Wires 836 and 846, leading, respectively, from the cooperating spring terminals on the body of the flyer lead to the insulated slip ring members 838 and 848, as shown. Cooperating with such slip ring members are the brushes 840 and 850 which are supported upon the terminal block 842.

It is obvious that the secondary back tensioning device of Fig. 29 may be employed in connection with a fixed primary tensioning device such as a magnetic ball tension; or that it may be employed in conjunction with the variable primary tensioning device such as shown in Fig. 28, in such case separate variable resistor controls and separate brushes and slip rings on the flyer being necessary for each of such variable tensioning devices. It is possible, however, by suitable modification of the device of Fig. 29, as by placing the wound field coil radially outwardly of the roller in the flyer and by decreasing the weight of the roller, as by making it hollow, to make such device impose a greater back tension when its field coil is increasingly energized. When such modified construction of device 662 is employed, connection between tension energizing means, the variable magnetic ball tension device of Fig. 28, and the thus modified device 662 may readily be made by connecting the fields of both tension devices to the slip rings 838 and 848 of Fig. 29.

It will be apparent that in the above described methods and apparatus the balloon whose diameter, and thus the length of material therein, is being controlled has such factors thereof held within desired limits by the alteration of the relative speeds at which the material feeds into the balloon and at which it is removed from the balloon, such alteration being effected in response to continuous measurement of one or more such factors of the balloon. In the described preferred embodiments of the system the speed of removal of material from the balloon is essentially constant, being carried out by the auxiliary capstan at the cabling and take-up twisting spindle, such capstan being driven by and in synchronism with the main shaft of such spindle, such main shaft being driven at a constant speed. Various embodiments of the described apparatus and method vary the speed of entry of the material into the balloon by imposing varying retarding tension on the infeeding material, either at the gathering pulley or by varying the tension in the singles balloons. Other embodiments, those varying the height of the cabling balloon, vary the tension in the cabling balloon relative to the sum of the tensions of the singles balloon, and thus vary the rate of feed of the material into the cabling balloon.

It is apparent that in the apparatus of Fig. 1 the twisting machine balances the tension in take-up balloon 128 against the sum of the tensions in supply balloons 46 and 54 by the imposition of a variable compensating tension additive to the sum of the tensions in the supply balloons. Such additive tension is imposed by the brake 208, which, as explained, when once adjusted imposes a fixed tension on the material entering balloon 128, and by brake 212, which imposes a variable tension on such material. In the twisting machines of Figs. 18, 24, 25, 26, and 27, on the other hand, the sum of the tensions in the singles supply balloons directly balances the tension in the take-up balloon at the medial diameters of all such balloons, the gathering pulley being idle in all such latter embodiments. In both the first embodiment and all the latter embodiments, however, the machine may be said to balance the sum of the tensions in the first, supply, balloon, against the tension in the second, take-up, balloon. In the embodiment of Fig. 1 the machine incorporates means, the primary and secondary brakes, acting to counteract a difference between the tension of materials entering the second balloon and the sum of the tensions of materials leaving the first balloons, whereas in the latter embodiments, by reason of the chosen medial heights and medial diameters of the singles supply balloons relative to such dimensions of the take-up balloon the sum of the tensions in the singles supply balloons directly balances or equals, at medial diameters of all balloons, the tension in the take-up balloon.

Whereas for purposes of illustration I have shown and described preferred embodiments of the method of and apparatus for controlling the size of the cabling or take-up balloon in a system wherein a plurality of singles spindles feed into a take-up spindle, and I have also described and illustrated preferred embodiments of my improved singles supply spindle and of the novel back tensioning devices employed therewith, it is to be understood that such embodiments are illustrative only and that the invention is capable of considerable variation as to details. The invention is, therefore, to be defined by the scope of the claims appended hereto.

I claim as new the following:

1. A strand-forming machine comprising a plurality of singles twisters, means for doubling the strands issuing from the singles twisters into a plied strand, each of said singles twisters effecting a twisting operation in a first free-flying balloon, said doubling means effecting a twisting operation in a second free-flying balloon, the machine balancing the sum of the tensions in the first balloons against the tension in the second balloon at medial dimensions of such balloons, means responsive to changes in the diameter of the second balloon, and means operative in response to said last named means to vary the tension of the elongated flexible material in the first balloons, thereby to restore the balance of the first and second balloons.

2. A strand-forming machine comprising a plurality of singles twisters, means for doubling the strands issuing from the singles twisters into a plied strand, each of said singles twisters effecting a twisting operation in a first free-flying balloon, said doubling means effecting a twisting operation in a second free-flying balloon, the machine balancing the sum of the tensions in the first balloons against the tension in the second balloon at medial dimensions of such balloons, means responsive to changes in the diameter of the second balloon, and means operative in response to said means responsive to changes in the diameter of the second balloon to vary the tension of the elongated flexible material in the first balloons, thereby to restore the balance of the first and second balloons, said last named means including means to vary the height of the first balloons.

3. A strand-forming machine comprising a plurality of singles twisters, means for doubling the strands issuing from the singles twisters into a plied strand, each of said singles twisters effecting a twisting operation in a first free-flying balloon, each singles twister including means to impose a back tension upon the strands prior to their entry into the first balloons, said doubling means effecting a twisting operation in a second free-flying balloon, the machine balancing the sum of the tensions in the first balloons against the tension in the second balloon at medial dimensions of such balloons, means responsive to changes in the diameter of the second balloon, and means operative in response to said last named means to vary the back tension operative upon the elongated flexible material in the first balloons, thereby to restore the balance of the first and second balloons.

4. A strand-forming machine comprising a plurality of singles twisters, means for doubling the strands issuing from the singles twisters into a plied strand, each of said singles twisters effecting a twisting operation in a first free-flying balloon, each singles twister including means to impose a back tension upon the strands prior to their entry into the first balloons, said doubling means effecting a twisting operation in a second free-flying balloon, the machine balancing the sum of the tensions in the first balloons against the tension in the second balloon at medial dimensions of such balloons, means responsive to changes in the diameter of the second balloon, and means operative in response to said means responsive to changes in the diameter of the second balloon to vary the tension operative upon the elongated flexible material in the first balloons, thereby to restore the balance of the first and second balloons, said last named means including means to vary the height of the first balloons and means to vary the back tension imposing means.

5. A strand-forming machine comprising a plurality of singles twisters, means for doubling the strands issuing from the singles twisters into a plied strand, said singles twisters effecting a twisting operation in a first free-flying balloon, said double means effecting a twisting operation in a second free-flying balloon, the machine balancing the sum of the tensions in the first balloons against the tension in the second balloon at medial dimensions of such balloons, means responsive to changes in the diameter of the second balloon, and means operative in response to said means responsive to changes in the diameter of the second balloon to vary the tension of the elongated flexible material in the first balloons, thereby to restore the balance of the first and second balloons, said last named means including means to vary the height of the first balloons.

6. A strand-forming machine comprising a first, supply unit comprising a plurality of singles twisters, a second, take-up unit for doubling the strands issuing from the singles twisters into a plied strand, each of said singles twisters effecting a twisting operation in a first free-flying balloon, said doubling means effecting a twisting operation in a second free-flying balloon, the machine balancing the sum of the tensions in the first balloons against the tensions in the second balloon at medial dimensions of such balloons, means responsive to changes in the diameter of at least one of the balloons in one of the units, and means operative in response to the means responsive to changes in the diameter of said balloon to vary the tension in the elongated flexible material in all the balloons of the other unit, thereby to restore the balance of the first and second balloons.

7. A strand-forming machine as claimed in claim 6 wherein the singles strands issuing from the singles twisters pass to the doubling means without the imposition of any substantial additional forwarding or retarding force thereon.

8. A strand-forming machine as claimed in claim 6 wherein the other unit includes means for varying the height of each of the balloons in said other unit, and wherein the means operative in response to the means responsive to changes in the diameter of said balloon control the means for varying the height of each of the balloons in said other unit.

9. A strand-forming machine comprising a plurality of singles twisters, means for doubling the strands issuing from the singles twisters into a plied strand, said singles twisters effecting a twisting operation in a first free-flying balloon, said doubling means effecting a twisting operation in a second free-flying balloon, the machine balancing the sum of the tensions in the first balloons against the tension in the second balloon at medial dimensions of such balloons, and means responsive to changes in size of the second balloon relative to at least one of the first balloons effective to change the relative tensions of said first and second balloons to restore the balance of the first and second balloons, said last named means including a guiding eye for the free end of each of the first and second balloons, means for measuring the torque imposed on each of the eyes of the first balloons and the eye of the second balloon by its respective balloon, and means for comparing the sums of the torques thus imposed on the eyes of the first balloons with the torque imposed on the eye of the second balloon.

10. A strand-forming machine comprising a plurality of singles twisters, means for doubling the strands issuing from the singles twisters into a plied strand, said singles twisters effecting a twisting operation in a first free-flying balloon, said doubling means effecting a twisting operation in a second free-flying balloon, the machine balancing the sum of the tensions in the first balloons against the tension in the second balloon at medial dimensions of such balloons, and means responsive to changes in size of the second balloon relative to at least one of the first balloons effective to change the relative tensions of said first and second balloons to restore the balance of the first and second balloons, said last named means including a guiding eye for the free end of each of the first and second balloons, means for measuring the torque imposed on the eye of the second balloon by its balloon, and means responsive to the last named means for adjusting the tension in each of the first balloons.

References Cited in the file of this patent

UNITED STATES PATENTS

| | | |
|---|---|---|
| 2,030,110 | Keight | Feb. 11, 1936 |
| 2,240,153 | Carter et al. | Apr. 29, 1941 |
| 2,391,307 | Gwaltney et al. | Dec. 18, 1945 |
| 2,397,153 | Naumann | Mar. 26, 1946 |
| 2,410,674 | Nelson | Nov. 5, 1946 |
| 2,478,926 | Kingsbury | Aug. 16, 1949 |
| 2,487,837 | Uhlig | Nov. 15, 1949 |
| 2,487,838 | Uhlig | Nov. 15, 1949 |
| 2,492,581 | Kingsbury | Dec. 27, 1949 |
| 2,492,778 | Agresti et al. | Dec. 27, 1949 |
| 2,550,136 | Clarkson | Apr. 24, 1951 |
| 2,552,150 | Cochran | May 8, 1951 |
| 2,560,848 | Cochran | July 17, 1951 |
| 2,563,641 | Colombu et al. | Aug. 7, 1951 |
| 2,586,037 | Heffelfinger | Feb. 19, 1952 |
| 2,586,038 | Heffelfinger et al. | Feb. 19, 1952 |
| 2,586,123 | Truitt | Feb. 19, 1952 |
| 2,614,381 | Uhlig | Oct. 21, 1952 |
| 2,635,413 | Truitt | Apr. 21, 1953 |
| 2,728,185 | Vibber | Dec. 27, 1955 |

FOREIGN PATENTS

| | | |
|---|---|---|
| 570,346 | Germany | Feb. 15, 1933 |